United States Patent
Uhr et al.

(10) Patent No.: US 11,416,930 B2
(45) Date of Patent: *Aug. 16, 2022

(54) METHOD FOR PROVIDING UNITED POINT SERVICE IN USE OF UNSPENT TRANSACTION OUTPUT BASED PROTOCOL AND SERVER USING THE SAME

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: COINPLUG, INC., Gyeonggi (KR)

( * ) Notice: Subject to any disclaimer, the term of this patent is extended or adjusted under 35 U.S.C. 154(b) by 596 days.

This patent is subject to a terminal disclaimer.

(21) Appl. No.: 15/857,017

(22) Filed: Dec. 28, 2017

(65) Prior Publication Data
US 2018/0189877 A1  Jul. 5, 2018

(30) Foreign Application Priority Data
Dec. 29, 2016 (KR) .................... 10-2016-0182599

(51) Int. Cl.
*G06Q 40/04* (2012.01)
*G06Q 20/38* (2012.01)
*G06F 16/90* (2019.01)

(52) U.S. Cl.
CPC ........... *G06Q 40/04* (2013.01); *G06Q 20/387* (2013.01); *G06Q 20/3823* (2013.01);
(Continued)

(58) Field of Classification Search
CPC ........... G06Q 40/04; G06Q 20/3829; G06Q 2220/00; G06Q 2220/10; H04L 9/3239;
(Continued)

(56) References Cited

U.S. PATENT DOCUMENTS 10,826,685 B1 * 11/2020 Campagna ............. H04L 67/02
2012/0239465 A1 * 9/2012 McInnes ................ G06Q 40/02
705/14.1
(Continued)

FOREIGN PATENT DOCUMENTS

KR 1020020036205 A 5/2005
KR 101591244 B1 2/2016

OTHER PUBLICATIONS

Andreas M. Antonopoulos, Mastering Bitcoin: Unlocking Digital Crypto-Currencies, 2014, O'Reilly Media, Inc. (Year: 2014).*
(Continued)

*Primary Examiner* — Neha Patel
*Assistant Examiner* — Nilesh B Khatri
(74) *Attorney, Agent, or Firm* — Xsensus LLP

(57) ABSTRACT

A method for registering a point distributor and information on an exchange rate for providing a united point service is provided. The method includes steps of: a system managing server (a) verifying a registration transaction TrxA and a confirmation transaction TrxB if at least one of conditions is satisfied which include (i) a condition that the TrxA having (i-1) a public key of a point managing server, and (i-2) a first XEA, an exchange rate of a point A managed by the point distributor to a united point, is acquired from a point distributing server, and (ii) a condition that the TrxB having (ii-1) a public key of the point distributing server, and (ii-2) a second XEA, is acquired from the point managing server; and (b) recording it on a certain blockchain database, and acquiring a transaction ID which locates the TrxA, the TrxB on the certain blockchain database.

7 Claims, 11 Drawing Sheets

(52) U.S. Cl.
CPC ......... *G06Q 20/3829* (2013.01); *G06F 16/90* (2019.01); *G06Q 2220/00* (2013.01); *G06Q 2220/10* (2013.01)

(58) Field of Classification Search
CPC ............... H04L 9/3246; H04L 67/1097; H04L 2209/38; G06F 16/90
See application file for complete search history.

(56) References Cited

U.S. PATENT DOCUMENTS

| | | | |
|---|---|---|---|
| 2017/0228734 A1* | 8/2017 | Kurian ............... | G06Q 20/3223 |
| 2018/0025435 A1* | 1/2018 | Karame ................ | G06Q 20/02 |
| | | | 705/30 |
| 2018/0089641 A1* | 3/2018 | Chan ...................... | G06Q 40/06 |
| 2018/0165476 A1* | 6/2018 | Carey .................. | H04L 9/3247 |

OTHER PUBLICATIONS

Merkle tree, Nov. 23, 2016, Wikipedia.org, pp. 1-4 (Year: 2016).*
Gareth W. Peters, et al., Understanding Modern Banking Ledgers Through Blockchain Technologies: Future of Transaction Processing and Smart Contracts on the Internet of Money, Nov. 18, 2015, Arxiv.org, pp. 1-30 (Year: 2015).*
Deloitte, Making Blockchain real for customer loyalty rewards program, 2016.
The next generation is an era of open financial platform with blockchain technology!, http://www.newsmaker.or.kr/news/articlePrint.html?idxno=19962, NewsMaker, Feb. 22, 2017.

* cited by examiner

FIG. 9

GENESIS BLOCK input0 = PrivBC_unique_message
input1 = TrxA
input2 = TrxB
input3 = TrxC h0 = sha256(input0)
h1 = sha256(input1)
h2 = sha256(input2)
h3 = sha256(input3)

h01 = sha256(h0 + h1)
h23 = sha256(h2 + h3)

h0123 = sha256(h01 + h23) = previous_root_hash

2$^{ND}$ BLOCK input4 = previous_root_hash
input5 = TrxD
input6 = TrxE
input7 = TrxF h4 = sha256(input4)
h5 = sha256(input5)
h6 = sha256(input6)
h7 = sha256(input7)

h45 = sha256(h4 + h5)
h67 = sha256(h6 + h7)

h4567 = sha256(h45 + h67)

FIG. 10

| USER PUBKEY | BALANCE |
|---|---|
| c4...dd | 20000 |
| c4...dd | 100000 |
| ... | ... |
| 18...69 | 500000 |

FIG. 11

| USER PUBKEY | BALANCE |
|---|---|
| c4...dd | +50000 |
| 18...69 | -100000 |

METHOD FOR PROVIDING UNITED POINT SERVICE IN USE OF UNSPENT TRANSACTION OUTPUT BASED PROTOCOL AND SERVER USING THE SAME

CROSS REFERENCE TO RELATED APPLICATION

This application claims priority to and incorporates herein by reference all disclosure in Korean patent application no. 10-2016-0182599 filed Dec. 29, 2016

FIELD OF THE INVENTION

The present invention relates to a method for providing a united point service in use of a UTXO-based protocol; and more particularly, to the method of verifying or supporting another device to verify at least one of a registration transaction TrxA and a confirmation transaction TrxB if at least one of conditions is satisfied which include (i) a condition that the TrxA having (i-1) a public key PubPS or its processed value of a point managing server which manages the united point service, and (i-2) a first XEA, which is an exchange rate of a unit of a point A which is managed by the point distributor to that of a united point, is acquired from a point distributing server of the point distributor, and (ii) a condition that the TrxB having (ii-1) a public key CPubA or its processed value of the point distributing server, and (ii-2) a second XEA which is the exchange rate, is acquired from the point managing server; and, if at least one of the TrxA and the TrxB is determined as valid, recording or supporting another device to record it or its processed value on a certain blockchain database, and acquiring or supporting another device to acquire at least one transaction ID which is at least one locator of at least one of the TrxA, the TrxB and their processed values on the certain blockchain database, and the system managing server using the same

BACKGROUND OF THE INVENTION

In general, points are intangible financial instruments which are worth certain monetary values for using goods and services, distributed for use in promoting sales of goods or services or in advertisement, etc., may be exchanged with a fiat money for a certain rate, and may be created as a rebate which is a consideration for purchase of goods and services. For example, the points may be something that functions as reserved money for next purchase of someone who purchased a product at a department store or a restaurant.

Recently, various points used in paying for plays, movies and books in addition to purchases at a restaurant, a department store, and an online store have seen common use, and are also becoming a new culture as the Internet becomes popular.

However, from the view of respective point distributors who provides point services, the distribution of the points which have almost the same value with the fiat money requires a level of security of a bank distributing currency, because a cracker may inflict a monetary loss on the point distributor and the franchised stores by unauthorized operation. For example, points like this are distributed over a network in a form of data, thus may be vulnerable to illegal copying or forgery, and may further have problems like duplicate issuance and distribution caused by system errors.

SUMMARY OF THE INVENTION

It is an object of the present invention to solve all the aforementioned problems.

It is another object of the present invention to provide a method of registering a point-related transaction with a blockchain of a virtual currency to prevent illegal copying and forgery, and a server using the same.

It is still another object of the present invention to guarantee a security and prevent forgery by forcing every entity participating in issuing, distributing and using of points to use cryptographical technologies like public key-private key pair algorithm, e.g., RSA, ECC, and hash functions, etc.

It is still yet another object of the present invention to provide a method of facilitating integrated and individual management by recording transactions about exchanging of each point and a united point on a blockchain of a virtual currency, and preventing problems like duplicate issuance, and a server using the same.

In accordance with one aspect of the present invention, there is provided a method for registering a point distributor and information on an exchange rate to provide a united point service, including steps of: (a) a system managing server verifying or supporting another device to verify at least one of a registration transaction TrxA and a confirmation transaction TrxB if at least one of conditions is satisfied which include (i) a condition that the TrxA having (i-1) a public key PubPS or its processed value of a point managing server which manages the united point service, and (i-2) a first XEA, which is an exchange rate of a unit of a point A which is managed by the point distributor to that of a united point, is acquired from a point distributing server of the point distributor, and (ii) a condition that the TrxB having (ii-1) a public key CPubA or its processed value of the point distributing server, and (ii-2) a second XEA which is the exchange rate, is acquired from the point managing server; and (b) the system managing server, if at least one of the TrxA and the TrxB is determined as valid, recording or supporting another device to record it or its processed value on a certain blockchain database, and acquiring or supporting another device to acquire at least one transaction ID which is at least one locator of at least one of the TrxA, the TrxB and their processed values on the certain blockchain database.

In accordance with another aspect of the present invention, there is provided a method for issuing a united point to provide a united point service, including steps of: (a) a system managing server verifying or supporting another device to verify an issuance transaction TrxA including (i) a public key CPubA or its processed value of a point distributor and (ii) a UPCA which is an issued amount of a united point of the point distributor, on condition that a confirmation transaction or its processed value including an exchange rate XEA of a unit of a point A managed by the point distributor to that of the united point has been recorded, and then if the TrxA is acquired from a point managing server which manages the united point service; and (b) if the TrxA is determined as valid, the system managing server recording or supporting another device to record the TrxA or its processed value on a certain blockchain database, and acquiring or supporting another device to acquire an issuance transaction ID which is a locator of the TrxA or its processed value on the certain blockchain database.

In accordance with still another aspect of the present invention, there is provided a method for distributing a united point to provide a united point service, including steps of: (a) a system managing server verifying or supporting another device to verify a distribution transaction TrxA including (i) a public key PubUA or its processed value of a user, and (ii) a united point UPUA of the user, on condition that an issuance transaction or its processed value including a UPCA which is an issued amount of the united point of a point distributor has been recorded, and then if the TrxA is acquired; and (b) the system managing server, if the TrxA is determined as valid, recording or supporting another device to record the TrxA or its processed value on a certain blockchain database, and acquiring or supporting another device to acquire a distribution transaction ID which is a locator of the TrxA or its processed value on the certain blockchain database.

In accordance with still yet another aspect of the present invention, there is provided a method of using a united point for providing a united point service, including steps of: (a) a system managing server verifying or supporting another device to verify a usage transaction TrxA including (i) a public key MPubA or its processed value of a seller who provides a user with goods or services, and (ii) a united point UPUA of the user, on condition that a distribution transaction or its processed value including the UPUA has been recorded, and then if the TrxA is acquired; and (b) the system managing server, if the TrxA is determined as valid, recording or supporting another device to record the TrxA or its processed value on a certain blockchain database, and acquiring or supporting another device to acquire a usage transaction ID which is a locator of the TrxA or its processed value on the certain blockchain database.

In accordance with still yet another aspect of the present invention, there is provided a method of refunding a united point for providing a united point service, including steps of: (a) a system managing server verifying or supporting another device to verify a refund transaction TrxA including (i) a public key PubPS or its processed value of a point managing server, and (ii) a united point UPMA of a point distributor or of a seller, on condition that at least one of (i) an issuance transaction or its processed value including a UPCA which is an issued amount of the united point of the point distributor or (ii) a usage transaction or its processed value including a UPUA which is the united point of a user transmitted to the seller, has been recorded, and then if the TrxA is acquired; and (b) the system managing server, if the TrxA is determined as valid, recording or supporting another device to record the TrxA or its processed value on a certain blockchain database, and acquiring or supporting another device to acquire a refund transaction ID which is a locator of the TrxA or its processed value on the certain blockchain database.

In accordance with still yet another aspect of the present invention, there is provided a system managing server for registering a point distributor and information on an exchange rate to provide a united point service, including: a communication part for acquiring or supporting another device to acquire at least one of (i) a registration transaction TrxA including (i-1) a public key PubPS or its processed value of a point managing server which manages the united point service, and (i-2) a first XEA, which is an exchange rate of a unit of a point A which is managed by a point distributor to that of a united point, from a point distributing server of the point distributor, and (ii) a confirmation transaction TrxB including (ii-1) a public key CPubA or its processed value of the point distributing server, and (ii-2) a second XEA which is the exchange rate, from the point managing server; and a processor for (i) verifying or supporting another device to verify at least one of the TrxA and the TrxB, (ii) if at least one of the TrxA and the TrxB is determined as valid, recording or supporting another device to record it or its processed value on a certain blockchain database, and (iii) acquiring or supporting another device to acquire at least one transaction ID which is at least one locator of at least one of the TrxA, the TrxB and their processed values on the certain blockchain database.

In accordance with still yet another aspect of the present invention, there is provided a system managing server for issuing a united point to provide a united point service, including: a communication part for, on condition that a confirmation transaction or its processed value including an exchange rate XEA of a unit of a point A managed by a point distributor to that of a united point has been recorded, acquiring or supporting another device to acquire an issuance transaction TrxA including (i) a public key CPubA or its processed value of the point distributor and (ii) a UPCA which is an issued amount of the united point of the point distributor, from a point managing server which manages the united point service; and a processor for (i) verifying or supporting another device to verify the TrxA, (ii) if the TrxA is determined as valid, recording or supporting another device to record the TrxA or its processed value on a certain blockchain database, and (iii) acquiring or supporting another device to acquire an issuance transaction ID which is a locator of the TrxA or its processed value on the certain blockchain database.

In accordance with still yet another aspect of the present invention, there is provided a system managing server for distributing a united point to provide a united point service, including: a communication part for, on condition that an issuance transaction or its processed value including a UPCA which is an issued amount of the united point of a point distributor has been recorded, acquiring or supporting another device to acquire a distribution transaction TrxA including (i) a public key PubUA or its processed value of a user, and (ii) a united point UPUA of the user; and a processor for (i) verifying or supporting another device to verify the TrxA, (ii) if the TrxA is determined as valid, recording or supporting another device to record the TrxA or its processed value on a certain blockchain database, and (iii) acquiring or supporting another device to acquire a distribution transaction ID which is a locator of the TrxA or its processed value on the certain blockchain database.

In accordance with still yet another aspect of the present invention, there is provided a system managing server of using a united point for providing a united point service, including: a communication part for, on condition that a distribution transaction or its processed value including a united point UPUA of a user has been recorded, acquiring or supporting another device to acquire a usage transaction TrxA including (i) a public key MPubA or its processed value of a seller who provides the user with goods or services, and (ii) the UPUA; and a processor for (i) verifying or supporting another device to verify the TrxA, (ii) if the TrxA is determined as valid, recording or supporting another device to record the TrxA or its processed value on a certain blockchain database, and (iii) acquiring or supporting another device to acquire a usage transaction ID which is a locator of the TrxA or its processed value on the certain blockchain database.

In accordance with still yet another aspect of the present invention, there is provided a system managing server of refunding a united point for providing a united point service, including: a communication part for, on condition that at least one of (i) an issuance transaction or its processed value including a UPCA which is an issued amount of the united point of a point distributor and (ii) a usage transaction or its processed value including a UPUA which is the united point of a user transmitted to a seller, has been recorded, acquiring or supporting another device to acquire a refund transaction TrxA including (i) a public key PubPS or its processed value of a point managing server, and (ii) a united point UPMA of the point distributor or of the seller; and a processor for (i) verifying or supporting another device to verify the TrxA, (ii) if the TrxA is determined as valid, recording or supporting another device to record the TrxA or its processed value on a certain blockchain database, and (iii) acquiring or supporting another device to acquire a refund transaction ID which is a locator of the TrxA or its processed value on the certain blockchain database.

BRIEF DESCRIPTION OF THE DRAWINGS

The above and other objects and features of the present invention will become apparent from the following description of preferred embodiments given in conjunction with the accompanying drawings, in which:

FIG. 9 is a diagram schematically illustrating a process of recording a point-related transaction on the second blockchain database in accordance with the fourth example embodiment of the present invention.

FIG. 10 is a diagram schematically illustrating information recorded on a balance database in accordance with a third and the fourth example embodiments of the present invention.

FIG. 11 is a diagram schematically illustrating at least one of delta_n of the balance database in accordance with the third and the fourth example embodiments of the present invention.

DETAILED DESCRIPTION OF THE PREFERRED EMBODIMENTS

Figure 1:
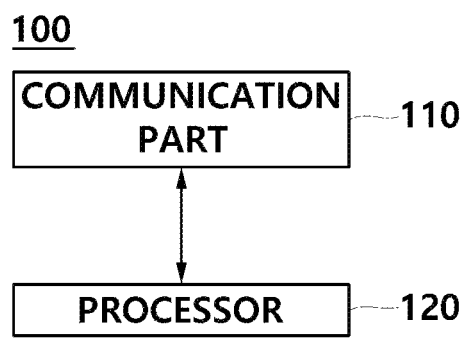
FIG. 1 is a diagram schematically illustrating a system managing server for providing a united point service in accordance with one example embodiment of the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

In this specification, a "public blockchain database" indicates every computing device, on a virtual currency system that resides over a public blockchain which is a blockchain used by public as a blockchain of the virtual currency, utilized as a database which may be accessed by a system managing server in accordance with the present invention.

Further, in this specification, a "private blockchain database" indicates a database using an independently configured private blockchain which is managed directly by the system managing server in accordance with the present invention, not the public blockchain, for the virtual currency.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A first example embodiment in accordance with the present invention discloses a UTXO mode which has a configuration of using an unspent transaction output, i.e., UTXO, of the virtual currency. That is, the first example embodiment discloses recording of individual transaction about the UTXO on a certain blockchain database.

A second example embodiment in accordance with the present invention discloses a UTXO-anchoring mode which has a configuration of anchoring that seeks two-fold integrity of record, by recording individual transactions about the UTXO on a first blockchain database and then recording a representative hash value, created from the transactions recorded on the first blockchain database, on a second blockchain database.

A third example embodiment in accordance with the present invention discloses an account mode which has a configuration of utilizing a balance database, i.e., BDB, for managing balances which are changed by transactions of the virtual currency where individual transactions are recorded on a certain blockchain database and changes in the balances are recorded on the BDB.

A fourth example embodiment in accordance with the present invention discloses an account-anchoring mode which has a configuration of anchoring that seeks the two-fold integrity of record, by (i) recording the individual transactions on the first blockchain database using the BDB, (ii) recording the changes in the balances on the BDB, and then (iii) recording a representative hash value created by using (iii-1) the transactions recorded on the first blockchain database and (iii-2) the changes in the balances stored in the BDB, on the second blockchain database.

For reference, in accordance with the present invention, the first blockchain database may be a blockchain database where data is stored directly, and the second blockchain database may be a blockchain database where the data is stored indirectly via the first blockchain database for assuring integrity of the data.

Meanwhile, in the first and the third example embodiments, the certain blockchain database may be the first blockchain database and may be the second blockchain database, where in the latter case, transactions may be recorded on the first blockchain database, and then, what has been recorded on the first blockchain database may be recorded on the second blockchain database.

Also, in the second and the fourth example embodiments, the second blockchain database may be for auditing, that is, later verifying the integrity of the data stored in the first blockchain database by way of additionally storing the data or its processed value which was recorded on the first blockchain database, therefore, the second blockchain database may adopt any of the UTXO mode or the account mode.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

FIG. 1 is a diagram schematically illustrating a system managing server for providing a united point service in accordance with one example embodiment of the present invention.

By referring to FIG. 1, the system managing server in accordance with one example embodiment of the present invention may be a computing device 100 which includes a communication part 110, a processor 120 and may communicate directly or indirectly with the point managing server, a point distributing server, a user terminal and a seller terminal. Each of the system managing server, the point managing server, the user terminal and the seller terminal may be a typical computing device 100.

Specifically, the system managing server, the point managing server, the point distributing server, the user terminal, and the seller terminal may typically achieve desired system performance by using combinations of a computing device, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow a computing device to function in a specific way.

The communication part 110 of such computing devices may transmit requests and receive responses with other linked devices. As one example, such requests and responses may be carried out by the same TCP session, but they are not limited to these. For example, they could be transmitted and received as UDP datagrams.

Also, the processor 120 of such devices may include hardware configuration of MPU (Micro Processing Unit) or CPU (Central Processing Unit), cache memory, data bus, etc. Additionally, OS and software configuration of applications that achieve specific purposes may be further included.

First Example Embodiment

A method of providing the united point service in accordance with the first example embodiment of the present invention is described as follows.

Figure 2:
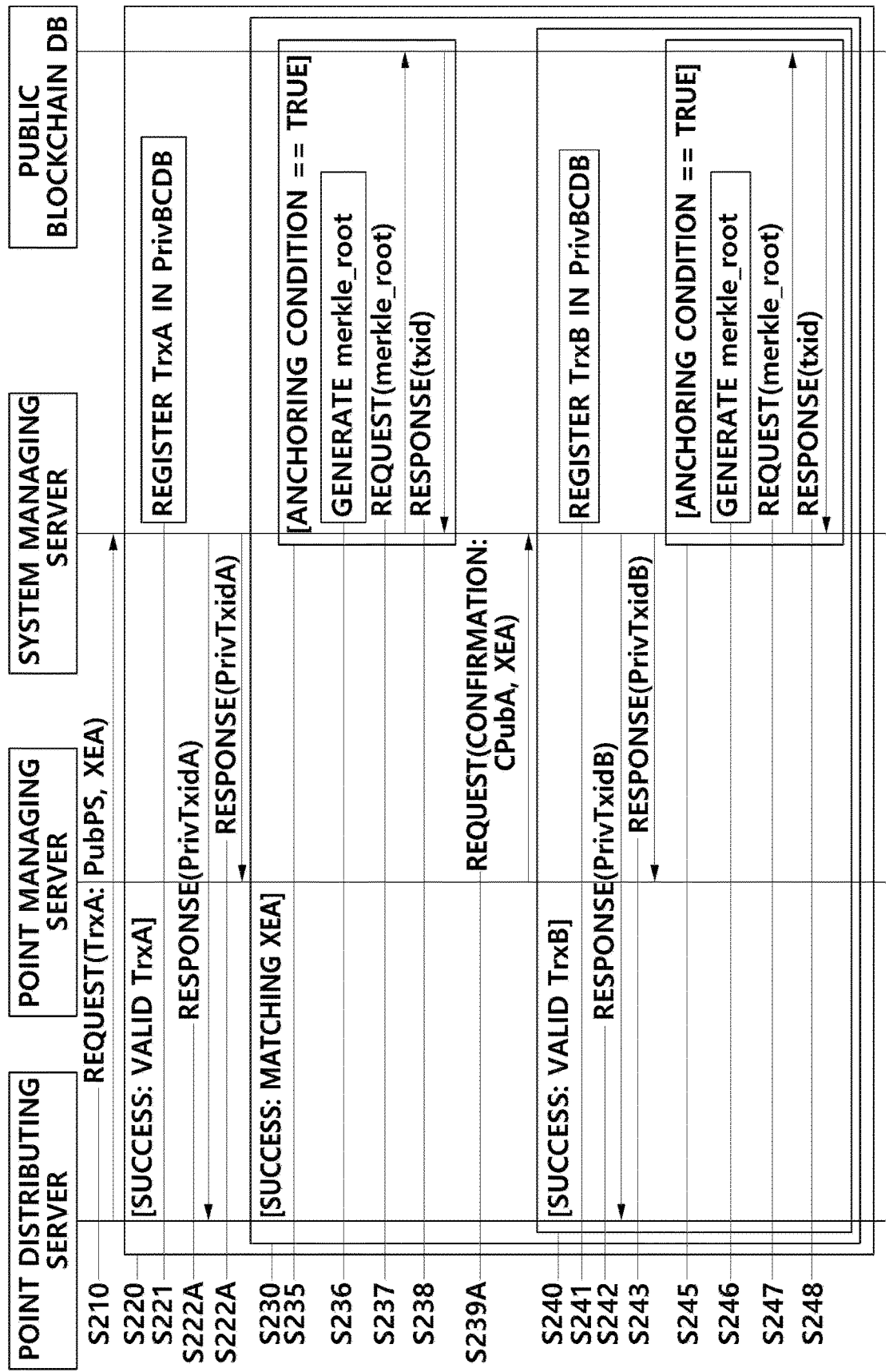
FIG. 2 is a sequence diagram schematically illustrating a method of registering a point distributor and an exchange rate in accordance with a first to a fourth example embodiments of the present invention.

FIG. 2 is a sequence diagram schematically illustrating a method of registering a point distributor and an exchange rate in accordance with the present invention.

By referring to FIG. 2, a method of registering the point distributor and the exchange rate for providing the united point service in accordance with the first example embodiment of the present invention may include steps S220 and S240 of the system managing server verifying or supporting another device to verify at least one of a registration transaction TrxA and a confirmation transaction TrxB if at least one of verifying conditions is satisfied which include (i) a condition that the TrxA having (i-1) a public key PubPS or its processed value of the point managing server which manages the united point service, and (i-2) a first XEA, which is the exchange rate of a unit of a point A which is managed by the point distributor to that of the united point, is acquired from the point distributing server of the point distributor, and (ii) a condition that the TrxB having (ii-1) a public key CPubA or its processed value of the point distributing server, and (ii-2) a second XEA which is the exchange rate, is acquired from the point managing server.

Herein, the "point managing server" may indicate a server operated by a managing entity who creates and manages the united point, and the "point distributing server" may indicate a server operated by an individual point distributor who manages its point system and distributes its points that may be interchangeable with the united points. The point managing server may perform a function of issuing the united point, and the point distributing server may perform a function of allowing the individual points into which the united point is exchanged to be distributed and used among the users.

The "registration transaction" may be a transaction (i) which includes (i-1) a public key of the point managing server for identifying the point managing server, and (i-2) the exchange rate between the united point and each of the individual points, (ii) which is acquired from the point distributor who is a distributing entity of the individual point to be exchanged for the united point by the point managing server, and (iii) which supports the system managing server to register the point distributor and its unique exchange rate.

The "confirmation transaction" may be a transaction (i) which includes (i-1) a public key of the point distributor to be registered, and (i-2) the exchange rate, (ii) which is acquired from the managing entity of the point managing server, and (iii) which supports the system managing server to confirm or certify the point distributor and its unique exchange rate.

The purpose of such a pair of the registration transaction and the confirmation transaction may be establishment of the point managing server, the point distributing server, and the exchange rate.

In the first example embodiment, the TrxA may include (i) the first XEA, a SigCPrivA(XEA) which is acquired by signing the first XEA with a private key CPrivA of the point distributor, and the CPubA, or (ii) their processed values.

The step of S220 may include verification of the registration transaction by using the SigCPrivA(XEA) and the CPubA, or their processed values.

In this case, a hash value may be acquired from the SigCPrivA(XEA) by using the CPubA and the SigCPrivA (XEA), and validity of the SigCPrivA(XEA) may be verified by comparing the hash value with a result of applying a hash function to the first XEA. In the comparison, it is known to those skilled in the art that the signature is valid if the hash value and the result of applying the hash function to the first XEA are identical and that the signature is invalid if they are not, therefore those skilled in the art may understand how to verify the signature, i.e., an electronic signature.

In the first example embodiment, the TrxB may include (i) the second XEA, a SigPrivPS(XEA) which is acquired by signing the second XEA with a private key PrivPS of the point managing server, and the PubPS, or (ii) their processed values. In this example embodiment, the step of S240, may include verification of the confirmation transaction TrxB by using the SigCPrivPS(XEA) and the PubPS, or their processed values.

At the above-mentioned steps of S220 and S240, the system managing server may determine or support another device to determine at least one of the TrxA and the TrxB as valid at a step of S230 if at least one of equivalence conditions is satisfied which include (i) a condition that at least one of the first XEA and the second XEA corresponds to a predetermined XEA, (ii) a condition that the first XEA corresponds to a third XEA that is an exchange rate included in a pre-stored confirmation transaction recorded before the TrxA is recorded, and (iii) a condition that the second XEA corresponds to a fourth XEA that is an exchange rate included in a pre-stored registration transaction recorded before the TrxB is recorded. Although FIG. 2 illustrates the determination of the equivalence conditions (i) to (iii) at the step S230 as taking place after the step S220 and before the step S240 for convenience, those skilled in the art may understand that this is merely an example of implementation of the general explanation above.

The predetermined XEA in the equivalence condition (i) may be, e.g., an exchange rate decided by consensus between the managing entity, i.e., the manager of the united point, of the point managing server and the managing entity, i.e., the point distributor, of the point distributing server outside of the system of the present invention, and the exchange rate may have been recorded on the first blockchain database or the second blockchain database in advance. The system managing server may compare the predetermined XEA with the exchange rate included in at least one of the acquired TrxA and the acquired TrxB.

Further, the equivalence conditions (ii) and (iii) above may correspond to a process at the step of S230 of comparing (a) the exchange rate included in a certain transaction recorded on the first or the second blockchain database before the transaction is acquired at the steps of S220 and S240 with (b) the exchange rate included in the transaction acquired at the steps of S220 and S240. These equivalence conditions (ii) and (iii) are required because the exchange rates included in the registration transaction and its corresponding confirmation transaction must be identical to each other, for determination of whether the consensus is reached between the point managing server and the point distributing server.

Meanwhile, if at least one of the TrxA and the TrxB is determined as invalid, the system managing server may transmit or support another device to transmit a response, representing at least one of the TrxA and the TrxB is invalid, to at least one of the point distributing server and the point managing server. This corresponds to the step of confirming whether a consensus is reached on a point distributing condition, i.e., an exchange rate, between the point managing server and the point distributing server.

By referring to FIG. 2 again, the method of registering the point distributor and the exchange rate for providing the united point service in accordance with the first example embodiment of the present invention further includes steps of S221 and S241, where if at least one of the TrxA and the TrxB is determined as valid, the system managing server may record or support another device to record it or its processed value on the certain blockchain database, and acquire or support another device to acquire at least one transaction ID which is at least one locator of at least one of the TrxA, the TrxB and their processed values on the certain blockchain database.

At the steps of S221 and S241, the system managing server may record or support another device to record at least one of the TrxA, the TrxB and their processed values on the first blockchain database, and record or support another device to record what has been recorded on the first blockchain database on the second blockchain database.

After the steps of S221 and S241, steps of S222a, S222b, S242, and S243 may be further included, where if at least one of the TrxA, the TrxB, and their processed values is recorded, the system managing server transmits or supports another device to transmit a response, including at least one PrivTxid which is at least one locator of at least one of the TrxA, the TrxB, and their processed values on the first blockchain database, to at least one of the point distributing server and the point managing server. The PrivTxid may be used for entities, i.e., the point managing server, the point distributing server, the user terminal, the seller terminal, etc., to refer to their corresponding transactions.

In case the second blockchain database is configured separately from the first blockchain database, the method of registering the point distributor and the exchange rate for providing the united point service in accordance with the first example embodiment of the present invention may further include a step, not illustrated, of the system managing server verifying or supporting another device to verify integrity of the first blockchain database by periodically comparing (i) at least one of the registration transaction TrxA, the confirmation transaction TrxB, and their processed values recorded on the first blockchain database with (ii) at least one of the TrxA, the TrxB, and their processed values recorded correspondingly on the second blockchain database. This is the step of auditing whether there was forgery of electronic record by confirming a match between data on the first blockchain database and data on the second blockchain database, and this step enables integrity of the blockchain databases to be verified multi-facetedly.

As one example, the first blockchain database may be a private blockchain database and the second blockchain database may be a public blockchain database.

However, it is not limited to these, and those skilled in the art will understand that the first blockchain database may be a private blockchain database or a public blockchain database, and that in the same manner, the second blockchain database may be a private blockchain database or a public blockchain database.

Next, the method of issuing the united point for providing the united point service in accordance with the first example embodiment of the present invention based on the aforementioned data structure is disclosed.

Figure 3:
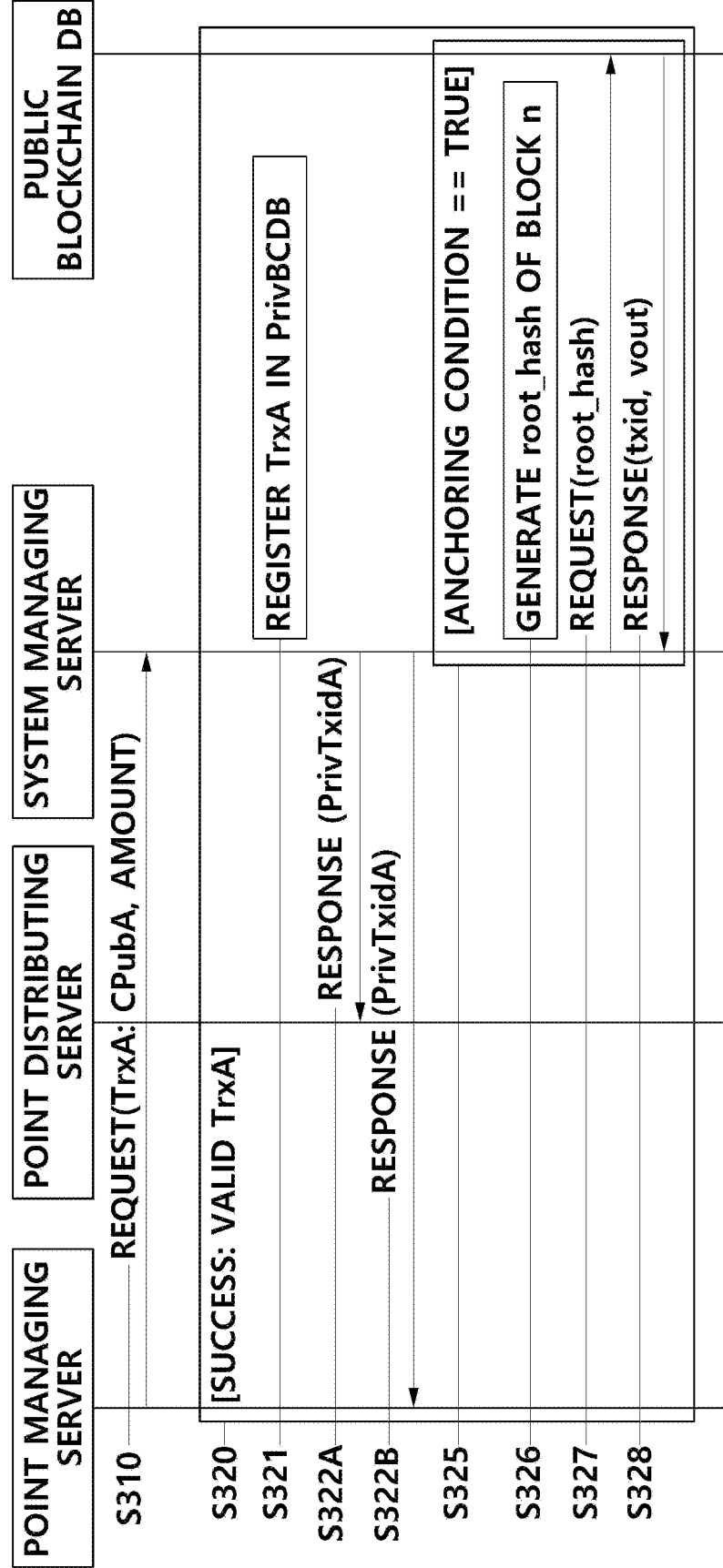
FIG. 3 is a sequence diagram schematically illustrating a method of issuing a united point in accordance with the first to the fourth example embodiments of the present invention.

FIG. 3 is a sequence diagram schematically illustrating the method of issuing the united point in accordance with the present invention.

By referring to FIG. 3, the method of issuing the united point for providing the united point service in accordance with the first example embodiment of the present invention may include a step S310 of the system managing server verifying or supporting another device to verify an issuance transaction TrxA, on condition that a confirmation transaction or its processed value including the second XEA of a unit of the point A managed by the point distributor to that of the united point has been recorded, if the issuance transaction TrxA including (i) a CPubA or its processed value which is a public key of the point distributor and (ii) a UPCA which is an issued amount of the united point of the point distributor is acquired from the point managing server which manages the united point service.

Herein, the "issuance transaction" may be a transaction that allows the point distributor to pay a certain price, e.g., a fiat money, to the managing entity of the point managing server and to be issued a certain amount of the united point. The united point as such may be treated as an individual point at the aforementioned exchange rate when distributed and managed by the point distributor.

In the first example embodiment, the issuance transaction TrxA may include (i) the CPubA or its processed value, (ii) the UPCA, (iii) the PubPS or its processed value, and (iv) a signature value acquired by signing at least one of (i) to (iii) with a private key PrivPS of the point managing server. In the present example embodiment, the step of S310 may include verification of the issuance transaction TrxA by using the acquired signature value and the PubPS or its processed value. The verification of the validity of the acquired signature value is similar to the aforementioned processes, therefore part of explanations are omitted.

Next, the method of issuing the united point for providing the united point service in accordance with the first example embodiment of the present invention further includes steps S320 and S321, where, if the issuance transaction TrxA is determined as valid, the system managing server may record or support another device to record the issuance transaction TrxA or its processed value on the certain blockchain database, and acquire or support another device to acquire an issuance transaction ID which is a locator of the issuance transaction TrxA or its processed value on the certain blockchain database.

At the steps of S320 and S321, the system managing server may record or support another device to record the issuance transaction TrxA or its processed value on the first blockchain database, and record or support another device to record what has been recorded on the first blockchain database on the second blockchain database.

If the issuance transaction TrxA is determined as invalid, the system managing server may transmit or support another device to transmit a response, indicating that the issuance transaction TrxA is invalid, to at least one of the point distributing server and the point managing server.

After the steps of S320 and S321, steps of S322A and S322B may be further included, where, if the issuance transaction TrxA or its processed value is recorded, the system managing server transmits or supports another device to transmit a response, including a PrivTxidA which is a locator of the issuance transaction TrxA or its processed value on the first blockchain database, to at least one of the point distributing server and the point managing server.

Also, in case the second blockchain database is configured separately from the first blockchain database, the method of issuing the united point for providing the united point service in accordance with the present invention may further include a step of the system managing server verifying or supporting another device to verify integrity of the first blockchain database by periodically comparing (i) at least one issuance transaction or its processed value recorded on the first blockchain database with (ii) at least one of the issuance transaction or its processed value recorded correspondingly on the second blockchain database. The part of explanation on this is omitted as it is similar to that of the method of registering the point distributor and the exchange rate.

Next, the method of distributing the united point for providing the united point service in accordance with the first example embodiment of the present invention is disclosed.

Figure 4:
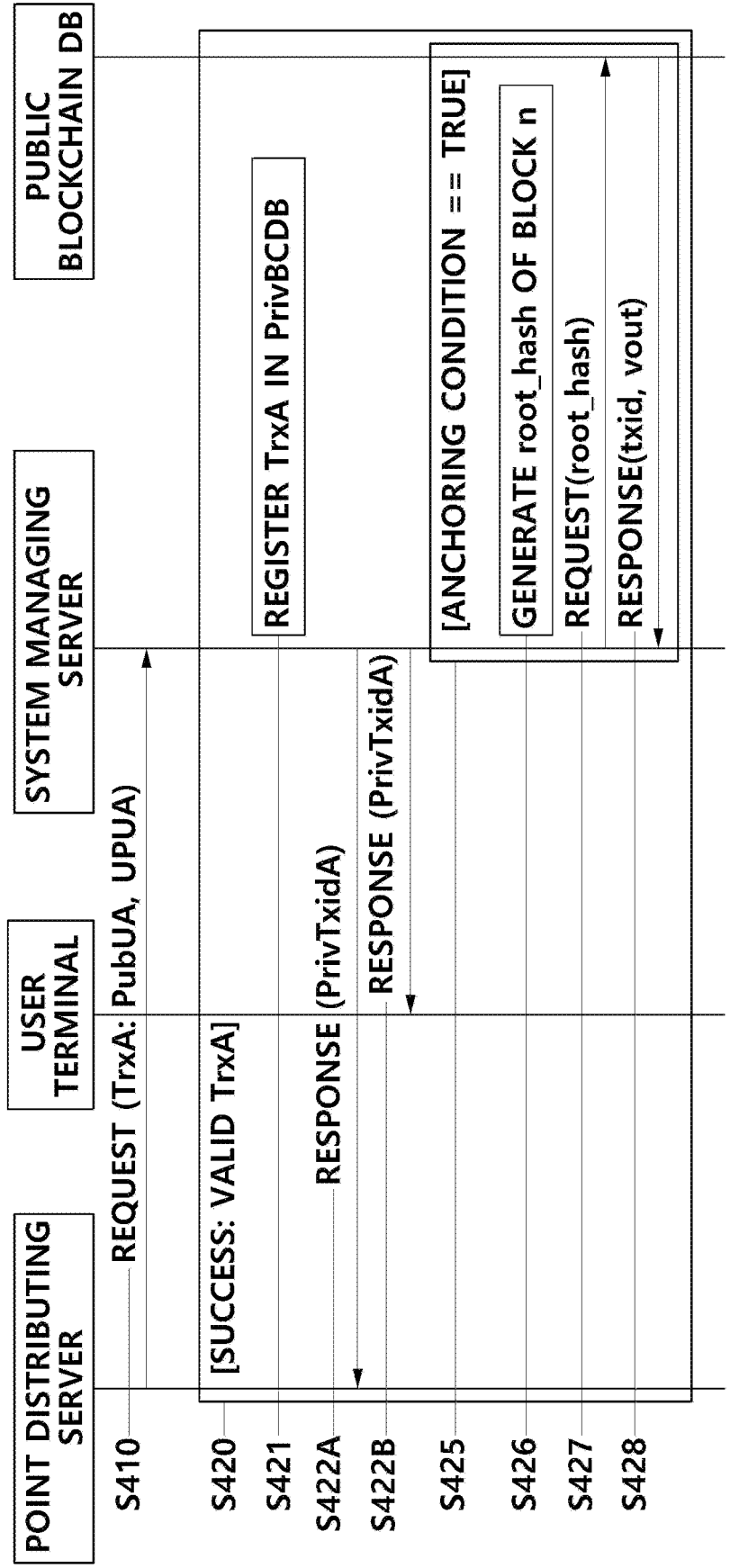
FIG. 4 is a sequence diagram schematically illustrating a method of distributing the united point in accordance with the first to the fourth example embodiments of the present invention.

FIG. 4 is a sequence diagram schematically illustrating the method of distributing the united point in accordance with the present invention. By referring to FIG. 4, the method of distributing the united point in accordance with the first example embodiment of the present invention may include a step S410 of the system managing server verifying or supporting another device to verify a distribution transaction TrxA including (i) a public key PubUA or its processed value of a user, and (ii) the united point UPUA of the user, on condition that an issuance transaction or its processed value including a UPCA which is an issued amount of the united point of the point distributor has been recorded, if the distribution transaction TrxA is acquired.

Herein, the "distribution transaction" may be a transaction that distributes part of the individual points managed by the point distributor to the individual users.

In the first example embodiment, the distribution transaction TrxA may include (i) a transaction locator PrivTxidA corresponding to an unspent united point, (ii) the CPubA or its processed value, (iii) a public key PubUA or its processed value of the user, and (iv) the UPUA, (v) a remaining amount of the united point after distribution, and (vi) a signature value acquired by signing at least one of (i) to (v) with a private key CPrivA of the point distributor. In the present example embodiment, the step of S410 may include verification of the distribution transaction TrxA by using the acquired signature value of the distribution transaction and the CPubA or its processed value. The verification of the validity of the signature value is similar to the aforementioned processes, therefore part of explanations are omitted.

Meanwhile, the united point owned by the user through the distribution transaction may be exchanged for the individual point managed by the point distributor at the exchange rate of the point distributor, and this value may be a separate item included in the distribution transaction or calculated at the time of use and refund. That is, although the points used by the user and managed by the point distributor are of each individual point system, these may be recorded and managed as the united point for convenience. For example, the user who received 1,000 united points may be treated as if s/he received 100 individual points, according to an exemplary exchange rate of 10 to 1 between the united point and the individual point.

Next, the method of distributing the united point for providing the united point service in accordance with the first example embodiment of the present invention further includes steps S420 and S421, where, if the distribution transaction TrxA is determined as valid, the system managing server may record or support another device to record the distribution transaction TrxA or its processed value on the certain blockchain database, and acquire or support another device to acquire a distribution transaction ID which is a locator of the distribution transaction TrxA or its processed value on the certain blockchain database.

At the steps of S420 and S421, the system managing server may record or support another device to record the distribution transaction TrxA or its processed value on the first blockchain database, and record or support another device to record what has been recorded on the first blockchain database on the second blockchain database.

If the distribution transaction TrxA is determined as invalid, the system managing server may transmit or support another device to transmit a response, indicating that the distribution transaction TrxA is invalid, to at least one of the point distributing server and the user terminal.

After the steps of S420 and S421, steps of S422A and S422B may be further included, where, if the distribution transaction TrxA or its processed value is recorded, the system managing server transmits or supports another device to transmit a response, including a PrivTxidA which is a locator of the distribution transaction TrxA or its processed value on the first blockchain database, to at least one of the point distributing server and the user terminal.

Also, the method of distributing the united point for providing the united point service in accordance with the first example embodiment of the present invention may further include a step, not illustrated, of the system managing server verifying or supporting another device to verify integrity of the first blockchain database by periodically comparing (i) at least one of the distribution transactions or its processed value recorded on the first blockchain database with (ii) at least one of the distribution transactions or its processed value recorded correspondingly on the second blockchain database. The part of explanation on this is omitted as it is similar to that of the method of registering the point distributor and the exchange rate.

Next, the method of using the united point for providing the united point service in accordance with the first example embodiment of the present invention is disclosed.

Figure 5:
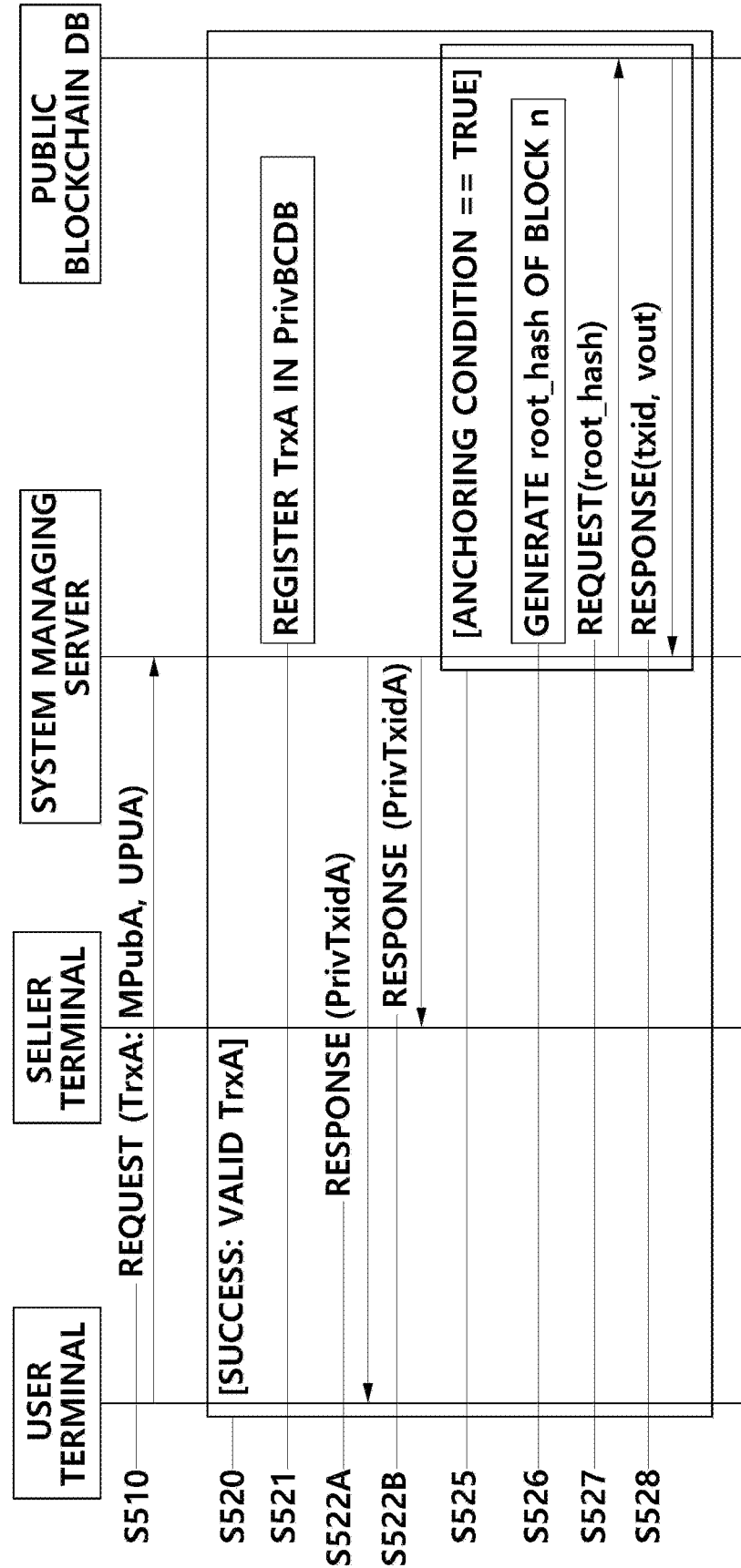
FIG. 5 is a sequence diagram schematically illustrating a method of using the united point in accordance with the first to the fourth example embodiments of the present invention.

FIG. 5 is a sequence diagram schematically illustrating the method of using the united point in accordance with the present invention. By referring to FIG. 5, the method of using the united point in accordance with the first example embodiment of the present invention may include a step S510 of the system managing server verifying or supporting another device to verify a usage transaction TrxA including (i) a public key MPubA or its processed value of a seller who provides a user with goods or services, and (ii) a united point UPUA of the user, on condition that a distribution transaction or its processed value including the UPUA has been recorded, if the usage transaction TrxA is acquired.

Herein, the "usage transaction" may be a transaction utilized for the individual users to purchase goods or services from the individual sellers, and the individual sellers may acquire the individual points from the individual users via the usage transaction.

In the first example embodiment, the usage transaction TrxA may include (i) a transaction locator PrivTxidA corresponding to an unspent united point, (ii) the MPubA or its processed value, (iii) a public key PubUA or its processed value of the user, and (iv) the UPUA, (v) a remaining amount of the united point after use, and (vi) a signature value acquired by signing at least one of (i) to (v) with a private key PrivUA of the user. In the present example embodiment, the step of S510 may include verification of the usage transaction TrxA by using the acquired signature value of the usage transaction and the PubUA or its processed value. The verification of the validity of the signature value is similar to the aforementioned processes, therefore part of explanations are omitted.

Next, the method of using the united point for providing the united point service in accordance with the first example embodiment of the present invention further includes steps S520 and S521, where, if the usage transaction TrxA is determined as valid, the system managing server may record or support another device to record the usage transaction TrxA or its processed value on the certain blockchain database, and acquire or support another device to acquire a usage transaction ID which is a locator of the usage transaction TrxA or its processed value on the certain blockchain database.

At the steps of S520 and S521, the system managing server may record or support another device to record the usage transaction TrxA or its processed value on the first blockchain database, and record or support another device to record what has been recorded on the first blockchain database on the second blockchain database.

If the usage transaction TrxA is determined as invalid, the system managing server may transmit or support another device to transmit a response, indicating that the usage transaction TrxA is invalid, to at least one of the seller terminal and the user terminal.

After the steps of S520 and S521, steps of S522A and S522B may be further included, where, if the usage transaction TrxA or its processed value is recorded, the system managing server transmits or supports another device to transmit a response, including a PrivTxidA which is a locator of the usage transaction TrxA or its processed value on the first blockchain database, to at least one of the seller terminal and the user terminal.

Also, the method of using the united point for providing the united point service in accordance with the first example embodiment of the present invention may further include a step, not illustrated, of the system managing server verifying or supporting another device to verify integrity of the first blockchain database by periodically comparing (i) at least one of the usage transactions or its processed value recorded on the first blockchain database with (ii) at least one of the usage transaction or its processed value recorded correspondingly on the second blockchain database. The part of explanation on this is omitted as it is similar to that of the method of registering the point distributor and the exchange rate.

Finally, the method of refunding the united point for providing the united point service in accordance with the first example embodiment of the present invention is disclosed.

Figure 6:
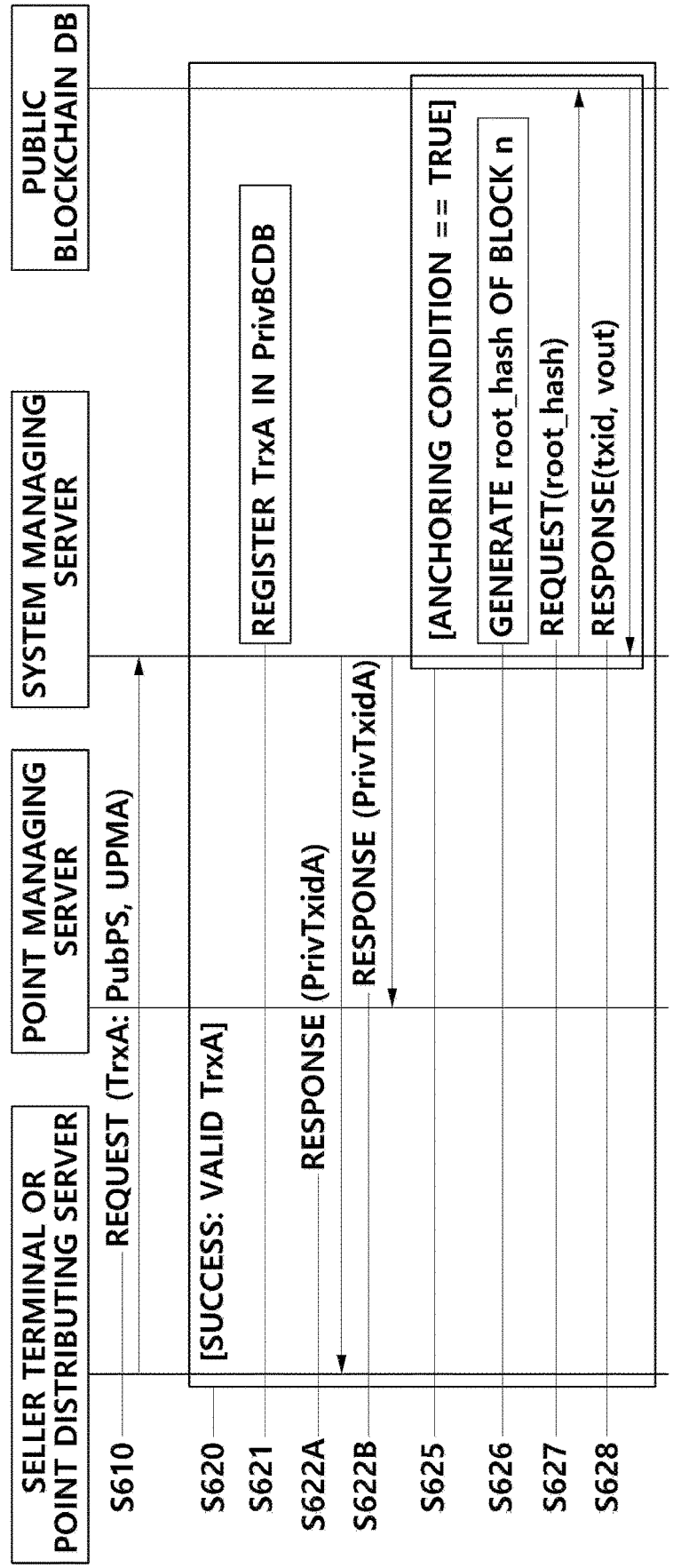
FIG. 6 is a sequence diagram schematically illustrating a method of refunding the united point in accordance with the first to the fourth example embodiments of the present invention.

FIG. 6 is a sequence diagram schematically illustrating the method of refunding the united point in accordance with the present invention. By referring to FIG. 6, the method of refunding the united point in accordance with the first example embodiment of the present invention may include a step S610 of the system managing server verifying or supporting another device to verify a refund transaction TrxA including (i) a public key PubPS or its processed value of the point managing server, and (ii) a united point UPMA of the point distributor or of the seller, on condition that (i) an issuance transaction or its processed value including a UPCA which is an issued amount of the united point of the point distributor or (ii) a usage transaction or its processed value including a UPUA which is the united point of the user transmitted to the seller, have been recorded, and then if the refund transaction TrxA is acquired.

Herein, the "refund transaction" may be a transaction for refunding the individual points to the individual users or the individual sellers as a fiat money, and the individual points may be refunded as a fiat money at the exchange rate and at a value of the fiat monetary value of the united point via the refund transaction.

In the first example embodiment, the refund transaction TrxA may include (i) a transaction locator PrivTxidA corresponding to an unspent united point, (ii) the PubPS or its processed value, (iii) a public key MPubA or its processed value of the point distributor or of the seller, and (iv) the UPMA, (v) a remaining amount of the united point after refund, and (vi) a signature value acquired by signing at least one of (i) to (v) with a private key MPrivA of the point distributor or of the seller. In the present example embodiment, the step of S610 may include verification of the refund transaction TrxA by using the acquired signature value and the MPubA or its processed value. The verification of the validity of the signature value is similar to the aforementioned processes, therefore part of explanations are omitted.

Next, the method of refunding the united point for providing the united point service in accordance with the first example embodiment of the present invention further includes steps S620 and S621, where, if the refund transaction TrxA is determined as valid, the system managing server may record or support another device to record the refund transaction TrxA or its processed value on the certain blockchain database, and acquire or support another device to acquire a refund transaction ID which is a locator of the refund transaction TrxA or its processed value on the certain blockchain database.

At the steps of S620 and S621, the system managing server may record or support another device to record the refund transaction TrxA or its processed value on the first blockchain database, and record or support another device to record what has been recorded on the first blockchain database on the second blockchain database.

If the refund transaction TrxA is determined as invalid, the system managing server may transmit or support another device to transmit a response, indicating that the refund transaction TrxA is invalid, to at least one of (i) the point managing server and (ii) the point distributing server or the seller terminal.

After the steps of S620 and S621, steps of S622A and S622B may be further included, where, if the refund transaction TrxA or its processed value is recorded, the system managing server transmits or supports another device to transmit a response, including a PrivTxidA which is a locator of the refund transaction TrxA or its processed value on the first blockchain database, to at least one of (i) the point managing server and (ii) the point distributing server or the seller terminal.

Also, the method of refunding the united point for providing the united point service in accordance with the first example embodiment of the present invention may further include a step, not illustrated, of the system managing server verifying or supporting another device to verify integrity of the first blockchain database by periodically comparing (i) at least one of the refund transactions or its processed value recorded on the first blockchain database with (ii) at least one of the refund transactions or its processed value recorded correspondingly on the second blockchain database. The part of explanation on this is omitted as it is similar to that of the method of registering the point distributor and the exchange rate.

The issuing, distributing, using and refunding of the points disclosed so far are summarized as follows. First, the point distributor and the exchange rate are registered according to the consensus between the point distributors and the managing entities of the point managing server, for issuing of the united point from the point managing server.

Next, the point managing server may issue a certain amount of the united point to the point distributing server, and the issued united point may be treated as the individual point at a certain exchange rate to the point distributors and their users and sellers.

The point distributing server may distribute the individual points recorded and managed as a certain amount of the united point to the individual users.

The individual points as such may be used by the individual user for purchasing goods or services from the individual seller, and the individual seller may acquire the individual points from the individual user through such use.

Then, the point managing server may receive a request for refund of the individual point from the individual sellers or the individual users, the individual point may be refunded as a fiat money at the exchange rate and the fiat monetary value as per the request.

Second Example Embodiment

Next, the second example embodiment of the method of providing the united point service in accordance with the present invention is disclosed. Below, the technological characteristics identical to that of the aforementioned first example embodiment will be omitted, and only specific details will be disclosed.

By referring to FIG. 2 again, the method of registering the point distributor and the exchange rate for providing the united point service in accordance with the second example embodiment of the present invention further includes, after the aforementioned steps of S220 and S240 in the first example embodiment, steps of S221 and S241, where if at least one of the registration transaction TrxA and the confirmation transaction TrxB is determined as valid, the system managing server 100 may record or support another device to record it or its processed value on the first blockchain database.

By referring to FIG. 2 again, the method of registering the point distributor and the exchange rate for providing the united point service in accordance with the present invention further includes steps of S235 to S238 and S245 to S248, where, in the second and the fourth example embodiments using an anchoring scheme, if at least one of anchoring conditions is satisfied, the system managing server may (i) record or support another device to record a representative hash value or its processed value on the second blockchain database and (ii) acquire or support another device to acquire a confirmation transaction ID which is a locator of the representative hash value or its processed value on the second blockchain database, where the representative hash value is calculated by using (i) a specific hash value which is a hash value of at least one of the registration transaction TrxA, the confirmation transaction TrxB or their processed values and (ii) its corresponding one or more neighboring hash values.

Herein, the anchoring conditions may include at least one of (i) a condition that a certain number of the specific hash value and the neighboring hash values are acquired or generated, (ii) a condition that a certain amount of time is elapsed, (iii) a condition that an n-th block is created in the first blockchain database, and (iv) a condition that has at least one of characteristics of services.

In the second example embodiment, at least one of the neighboring hash values may be at least one of (i) a hash value of a specific registration transaction including a specific exchange rate XEX of a specific point X managed by a specific point distributor to the united point, (ii) a hash value of a specific confirmation transaction including the XEX, (iii) a hash value of a specific issuance transaction including (iii-1) a public key CPubX or its processed value of the specific point distributor and (iii-2) a UPCX which is a certain issued amount of the united point of the specific point distributor, (iv) a hash value of a distribution transaction including (iv-1) a public key PubUA or its processed value of a specific user and (iv-2) a united point UPUA of the specific user, (v) a hash value of a usage transaction including (v-1) a public key MPubA or its processed value of a specific seller who provides the specific user with goods or services and (v-2) the UPUA, and (vi) a hash value of a refund transaction including (vi-1) the PubPS or its processed value, and (vi-2) a united point UPMA of the specific point distributor or of the specific seller.

The calculation by using the specific hash value and at least one of the neighboring hash values may be performed by various functions. Assume that the specific hash value is an input, and that the neighboring hash values are x1, x2, xn, then a representative hash value t may be expressed as a following formula.

$$t=\text{hash}(\text{function}(\text{input}, x1, x2, \ldots, xn)) \quad <\text{Formula 1}>$$

Herein, the system managing server may record and manage the specific hash value and at least one of the neighboring hash values in a certain data structure. Herein, the data structure may vary and one example may be a Merkle tree. In this case, the calculation of (i) the specific hash value and (ii) at least one hash value of at least one neighboring node which corresponds to the node of the specific hash value may be performed by using the Merkle tree.

In other words, the system managing server may perform (i) a process of creating at least one Merkle tree by allotting the specific hash value to its leaf node, and (ii) a process of registering, if the at least one of anchoring conditions is satisfied, the representative hash value or its processed value calculated by using (ii-1) the specific hash value of a specific leaf node and (ii-2) at least one hash value allocated to at least one of other leaf nodes corresponding to the specific leaf node, with the second blockchain database.

The system managing server may record the hash value allocated to the root node as the representative hash value on the second blockchain database. Herein, a processed value of the representative hash value may be recorded. For example, a resultant value from hex operation of the representative hash value may be recorded.

Meanwhile, a first data structure and a second data structure may be connected in a form of a chain if the system managing server stores the specific hash value and the at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message initially given by the system managing server may be allocated.

Figure 7:
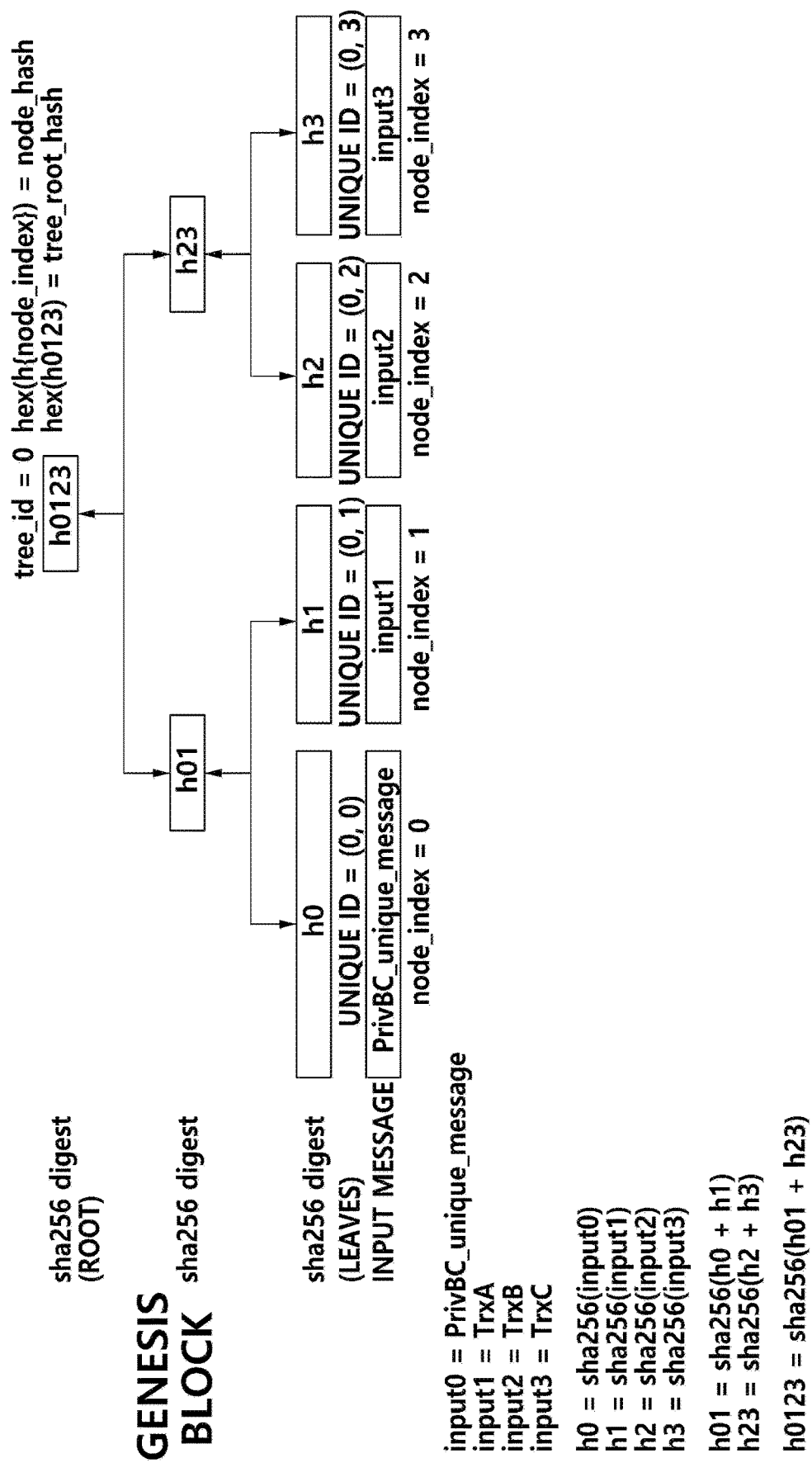
FIGS. 7 and 8 are diagrams schematically illustrating a process of recording a point-related transaction on a second blockchain database in accordance with the first to the fourth example embodiments of the present invention.
Figure 8:
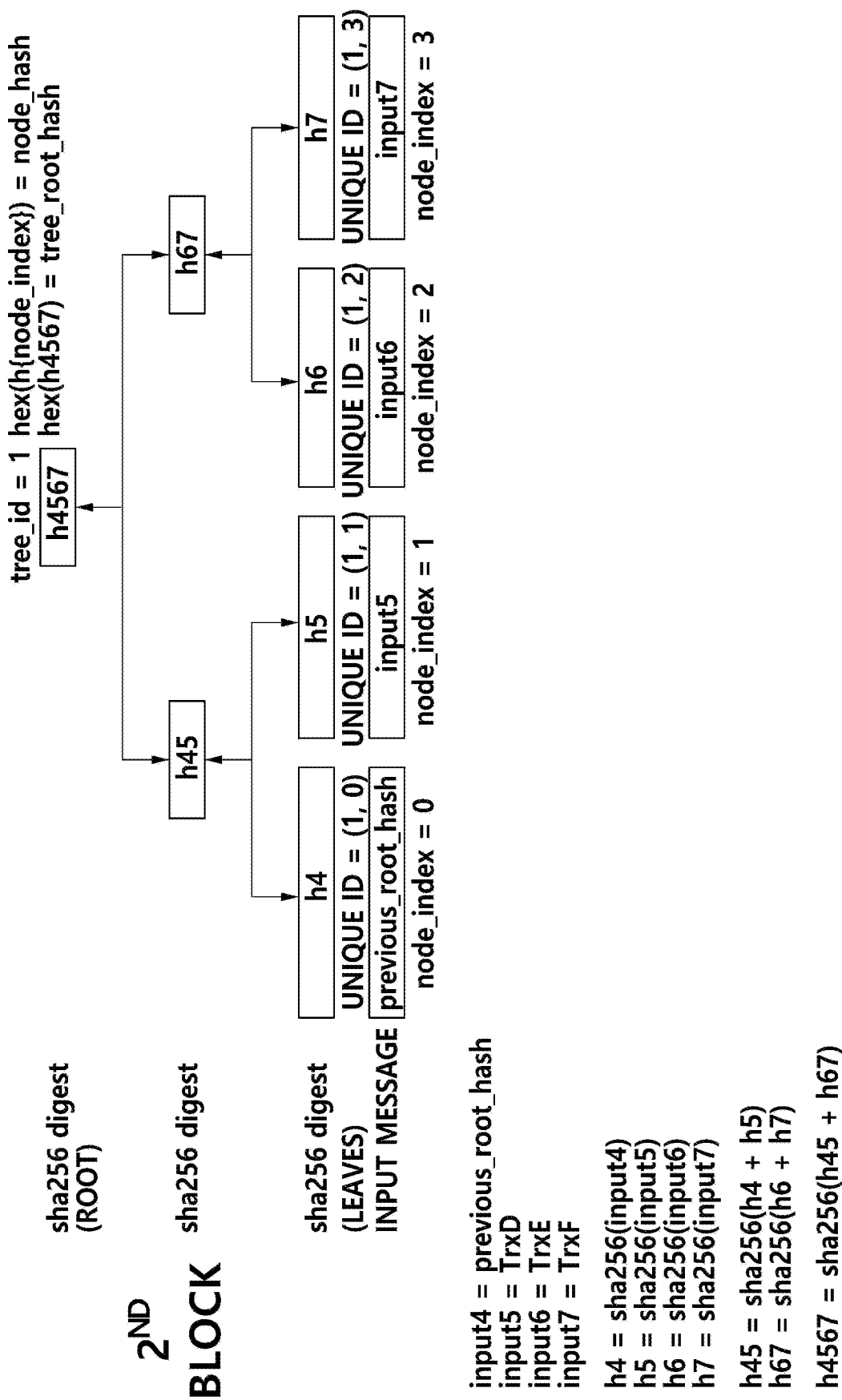

FIGS. 7 and 8 are diagrams illustrating an example of a Merkle tree created in accordance with the present invention.

FIG. 7 illustrates a Merkle tree with four, i.e., 22, leaf nodes. As the illustrated Merkle tree is a first Merkle tree whose tree_id is zero, a hash value SHA256(PrivBC_unique_message) of PrivBC_unique_message is allocated to an h1 node which is a first leaf node. If transactions are being recorded, the system managing server may create a leaf node next to a last leaf node of the Merkle tree currently being configured and may allocate the specific hash value or its processed value to the created leaf node. For example, if an allocation of values is completed with the h1 node as a last which is a second leaf node of the Merkle tree in FIG. 7, and if a new leaf node is to be created, then an h2 node which is a next leaf node may be created and the specific hash value or its processed value sha256(input2) may be allocated to the h2 node. Further, the system managing server may calculate by using (i) a specific hash value and (ii) a hash value allocated to an h3 node which is a sibling node of the h2 node which is a third leaf node to which the specific hash value is allocated. The hash value of the calculated value above may be allocated to an h23 node which is a parent node of the h2 node and the h3 node. As the parent node, i.e., the h23 node, is not the root node of the Merkle tree, the system managing server may repeat the process by regarding the hash value allocated to the h23 node as the specific hash value. In other words, with the hash value allocated to the h23 node as a specific hash value, the hash values allocated to the h23 node and an h01 node may be used together to be calculated and allocated to an h0123 node which is a parent node of the h23 node and the h01 node. Herein, as the h0123 node is the root node, the system managing server may record the processed value hex(h{node index}) of the hash value allocated to the h0123 node on the second blockchain database.

To explain this in a recursive way, if at least one of the anchoring conditions is satisfied, the system managing server may (x1) calculate an intermediate value by using (i) the specific hash value and (ii) a hash value allocated to a sibling node of the specific leaf node, and then allocate a hash value of the intermediate value to a parent node of the specific leaf node, (x2) record the hash value of the intermediate value on the second blockchain database as the representative hash value if the parent node is a root node of the Merkle tree, and (x3) repeat the steps from (x1) to (x3) by regarding the hash value of the intermediate value as the specific hash value and regarding the parent node as the specific leaf node if the parent node is not the root node.

In the second example embodiment, if hash values are acquired whose cardinal number equals to that of the leaf nodes, each of the hash values may be an input value, i.e., a value allocated to the leaf node, of the aforementioned Merkle tree, where the hash value may be at least one of (i) a hash value of a specific registration transaction including a specific exchange rate XEX of a specific point X managed by a specific point distributor to the united point, (ii) a hash value of a specific confirmation transaction including the XEX, (iii) a hash value of a specific issuance transaction including the CPubX or its processed value, and the UPCX, (iv) a hash value of a distribution transaction including the PubUA or its processed value, and the UPUA, (v) a hash value of a usage transaction including the MPubA or its processed value, and the UPUA, and (vi) a hash value of a refund transaction including the PubPS or its processed value, and the UPMA.

Also, the system managing server may create a root value of the Merkle tree aforementioned at stated intervals, by referring to the anchoring condition (ii) above. In this case, the system managing server, if a certain amount of time is elapsed, may create the Merkle tree by referring to input values by the time, and may record the root value of the Merkle tree on the second blockchain database.

However, in this case, a value may not be allocated to a sibling node of the node to which a specific hash value is allocated even though a certain amount of time is elapsed. In case no hash value is allocated to the sibling node even though at least one of the anchoring conditions is satisfied, the system managing server may allocate a certain hash value to the sibling node to thereby produce a root value of the Merkle tree by the method aforementioned. For example, the system managing server may copy and allocate the specific hash value to the sibling node.

The characteristics of services may be at least part of information on cost paid by the entities who use the united point service, information on a time-zone during which the recording of the transaction is performed, information on a location where the recording of the transaction is performed and information on a type of a company which is a managing entity of a server involved in the recording. However, it is not limited to these.

Meanwhile, if a creation of a new Merkle tree starts and if at least one of the anchoring conditions is satisfied with no transaction having been received, the system managing server may create the new Merkle tree by allotting certain message data to its first and second leaf nodes and may record the root value of the new Merkle tree or its processed value on the second blockchain database. In this case, the new Merkle tree with two leaf nodes may be created.

Meanwhile, a first data structure and a second data structure may be connected in a form of a chain if the system managing server, as aforementioned, stores the specific hash value and the at least one neighboring hash value in the first data structure and then stores and manages the second data structure identical in a form to the first data structure. Especially, if the first data structure and the second data structure are Merkle trees, a root value of the first data structure or a hash value of the root value may be allocated to a first leaf node of the second data structure.

FIG. 8 is a diagram illustrating an example of a Merkle tree created in a form of the second data structure in accordance with the present invention.

By referring to FIG. 8, it is clear that the root value hex(h0123) of the Merkle tree whose tree_id is zero in FIG. 7 is allocated to the first leaf node which is an h4 node of a new Merkle tree. In such a manner, the present invention has advantage of improving data integrity, as tracking becomes easier even in the case of data forgery, by connecting multiple data structures created when a transaction occurs.

Also, the method of registering the point distributor and the exchange rate for providing the united point service in accordance with the second example embodiment of the present invention may further include a step, not illustrated, of the system managing server verifying or supporting another device to verify integrity of the first blockchain database by periodically comparing (i) a first representative hash value or its processed value calculated by using (i-1) a hash value of at least one of the registration transaction, the confirmation transaction or their processed values recorded on the first blockchain database and (i-2) its corresponding one or more neighboring hash values with (ii) its corresponding second representative hash value or its processed value recorded on the second blockchain database.

Next, the method of issuing the united point for providing the united point service in accordance with the second example embodiment of the present invention is disclosed, but the technological characteristics identical to that of the aforementioned first example embodiment will be omitted, and only specific details will be disclosed.

By referring to FIG. 3, the method of issuing the united point for providing the united point service in accordance with the second example embodiment of the present invention may include a step S310 of the system managing server verifying or supporting another device to verify an issuance transaction TrxA, on condition that a first representative hash value or its processed value created from a first specific hash value which is a hash value of a confirmation transaction or its processed value including the second XEA has been recorded on the second blockchain database, if the issuance transaction TrxA including (i) the CPubA or its processed value and (ii) the UPCA is acquired from the point managing server which manages the united point service.

By referring to FIG. 3 again, the method of issuing the united point for providing the united point service in accordance with the second example embodiment of the present invention may further include steps of S325 to S328, where, after the steps of S320 and S321, if at least one of the anchoring conditions is satisfied, the system managing server may (i) record or support another device to record a second representative hash value or its processed value calculated by using (i-1) a second specific hash value which is a hash value of the valid issuance transaction TrxA or its processed value and (i-2) its corresponding one or more neighboring hash values, on the second blockchain database and (ii) acquire or support another device to acquire an issuance transaction ID which is a locator of the second representative hash value or its processed value on the second blockchain database. This is similar to the aforementioned method of registering the point distributor and the exchange rate for providing the united point service. On the other hand, processes of creating the representative hash value from the specific hash value and recording it on the second blockchain database are similar to the processes aforementioned, and thus omitted.

Also, the method of issuing the united point for providing the united point service in accordance with the second example embodiment of the present invention may further include a step of the system managing server verifying or supporting another device to verify integrity of the first blockchain database by periodically comparing (i) a representative hash value or its processed value calculated by using (i-1) a hash value of at least one issuance transaction or its processed value recorded on the first blockchain database and (i-2) its corresponding one or more neighboring hash values with (ii) its corresponding second representative hash value or its processed value recorded on the second blockchain database. The part of explanation on this is omitted as it is similar to that on the aforementioned method of registering the point distributor and the exchange rate in accordance with the present invention.

Next, the method of distributing the united point for providing the united point service in accordance with the second example embodiment of the present invention is disclosed, but the technological characteristics identical to that of the aforementioned first example embodiment will be omitted, and only specific details will be disclosed.

By referring to FIG. 4, the method of distributing the united point in accordance with the second example embodiment of the present invention may include a step S410 of the system managing server 100 verifying or supporting another device to verify a distribution transaction TrxA including (i) a public key PubUA or its processed value of a user, and (ii) a united point UPUA of the user, on condition that a first representative hash value or its processed value created from a first specific hash value which is a hash value of an issuance transaction or its processed value including the UPCA has been recorded on the second blockchain database, if the distribution transaction TrxA is acquired.

By referring to FIG. 4 again, the method of distributing the united point for providing the united point service in accordance with the second example embodiment of the present invention may further include steps of S425 to S428, where, after the steps of S420 and S421, if at least one of the anchoring conditions is satisfied, the system managing server 100 may (i) record or support another device to record a second representative hash value or its processed value calculated by using (i-1) a second specific hash value which is a hash value of the valid distribution transaction TrxA or its processed value and (i-2) its corresponding one or more neighboring hash values, on the second blockchain database and (ii) acquire or support another device to acquire a distribution transaction ID which is a locator of the second representative hash value or its processed value on the second blockchain database. This is similar to the aforementioned method of registering the point distributor and the exchange rate for providing the united point service. On the other hand, processes of creating the representative hash value from the specific hash value and recording it on the second blockchain database are similar to the processes aforementioned, and thus omitted.

Also, the method of distributing the united point for providing the united point service in accordance with the second example embodiment of the present invention may further include a step, not illustrated, of the system managing server verifying or supporting another device to verify integrity of the first blockchain database by periodically comparing (i) a representative hash value or its processed value calculated by using (i-1) a hash value of at least one distribution transaction or its processed value recorded on the first blockchain database and (i-2) its corresponding one or more neighboring hash values with (ii) its corresponding second representative hash value or its processed value recorded on the second blockchain database. The part of explanation on this is omitted as it is similar to that on the aforementioned method of registering the point distributor and the exchange rate in accordance with the present invention.

Next, the method of using the united point for providing the united point service in accordance with the second example embodiment of the present invention is disclosed, but the technological characteristics identical to that of the aforementioned first example embodiment will be omitted, and only specific details will be disclosed.

By referring to FIG. 5, the method of using the united point in accordance with the second example embodiment of the present invention may include a step S510 of the system managing server 100 verifying or supporting another device to verify a usage transaction TrxA including (i) a public key MPubA or its processed value of a seller who provides a user with goods or services, and (ii) the UPUA, on condition that a first representative hash value or its processed value created from a first specific hash value which is a hash value of a distribution transaction or its processed value including the UPUA has been recorded on the second blockchain database, if the usage transaction TrxA is acquired.

By referring to FIG. 5 again, the method of using the united point for providing the united point service in accordance with the second example embodiment of the present invention may further include steps of S525 to S528, where, after the steps of S520 and S521, if at least one of the anchoring conditions is satisfied, the system managing server may (i) record or support another device to record a second representative hash value or its processed value calculated by using (i-1) a second specific hash value which is a hash value of the valid usage transaction TrxA or its processed value and (i-2) its corresponding one or more neighboring hash values, on the second blockchain database and (ii) acquire or support another device to acquire a usage transaction ID which is a locator of the second representative hash value or its processed value on the second blockchain database. This is similar to the aforementioned method of registering the point distributor and the exchange rate for providing the united point service. On the other hand, processes of creating the representative hash value from the specific hash value and recording it on the second blockchain database are similar to the processes aforementioned, and thus omitted.

Also, the method of using the united point for providing the united point service in accordance with the second example embodiment of the present invention may further include a step, not illustrated, of the system managing server verifying or supporting another device to verify integrity of the first blockchain database by periodically comparing (i) a representative hash value or its processed value calculated by using (i-1) a hash value of at least one usage transaction or its processed value recorded on the first blockchain database and (i-2) its corresponding one or more neighboring hash values with (ii) its corresponding second representative hash value or its processed value recorded on the second blockchain database. The part of explanation on this is omitted as it is similar to that on the aforementioned method of registering the point distributor and the exchange rate in accordance with the present invention.

Next, the method of refunding the united point for providing the united point service in accordance with the second example embodiment of the present invention is disclosed, but the technological characteristics identical to that of the aforementioned first example embodiment will be omitted, and only specific details will be disclosed.

By referring to FIG. 6, the method of refunding the united point in accordance with the second example embodiment of the present invention may include a step S610 of the system managing server verifying or supporting another device to verify a refund transaction TrxA including (i) the PubPS or its processed value, and (ii) the UPMA, on condition that a first representative hash value or its processed value created from a first specific hash value which is a hash value of (i) an issuance transaction or its processed value including the UPCA or (ii) a usage transaction or its processed value including a UPUA which is the united point of the user transmitted to the seller, have been recorded on the second blockchain database, and then if the refund transaction TrxA is acquired.

By referring to FIG. 6 again, the method of refunding the united point for providing the united point service in accordance with the second example embodiment of the present invention may further include steps of S625 to S628, where, after the steps of S620 and S621, if at least one of the anchoring conditions is satisfied, the system managing server may (i) record or support another device to record a second representative hash value or its processed value calculated by using (i-1) a second specific hash value which is a hash value of the valid refund transaction TrxA or its processed value and (i-2) its corresponding one or more neighboring hash values, on the second blockchain database and (ii) acquire or support another device to acquire a refund transaction ID which is a locator of the second representative hash value or its processed value on the second blockchain database. This is similar to the aforementioned method of registering the point distributor and the exchange rate for providing the united point service. On the other hand, processes of creating the representative hash value from the specific hash value and recording it on the second blockchain database are similar to the processes aforementioned, and thus omitted.

Also, the method of refunding the united point for providing the united point service in accordance with the second example embodiment of the present invention may further include a step, not illustrated, of the system managing server verifying or supporting another device to verify integrity of the first blockchain database by periodically comparing (i) a representative hash value or its processed value calculated by using (i-1) a hash value of at least one refund transaction or its processed value recorded on the first blockchain database and (i-2) its corresponding one or more neighboring hash values with (ii) its corresponding second representative hash value or its processed value recorded on the second blockchain database. The part of explanation on this is omitted as it is similar to that on the aforementioned method of registering the point distributor and the exchange rate in accordance with the present invention.

Third Example Embodiment

Next, the third example embodiment of the method of providing the united point service in accordance with the present invention is disclosed. Below, the technological characteristics identical to those of the aforementioned first and second example embodiments will be omitted, and only specific details will be disclosed. The third example embodiment does not disclose a technical characteristic, e.g., a technical characteristic of using a Merkle tree, of calculating a representative hash value further utilizing neighboring hash values as in the first example embodiment, different from that of the second and the fourth example embodiments.

In the method of registering the point distributor and the exchange rate for providing the united point service in accordance with the third example embodiment of the present invention, the registration transaction TrxA may include (i) a unique nonce, (ii) the CPubA or its processed value, (iii) the PubPS or its processed value, and (iv) the first XEA, and (v) a signature value acquired by signing at least one of (i) to (iv) with the CPrivA.

Herein, the unique nonce may have a purpose of preventing a replay attack, and it is an arbitrary number that can only be used once, which may be a time stamp, but it is not limited to this. For example, the unique nonce may be a random value generated from an arbitrary seed. Further details on various methods to create the unique nonce will not be explained as it is not necessary for understanding the present invention, but these may be known or easily understandable by those skilled in the art.

In case information on points owned by each entity is managed by the BDB as in the third example embodiment of the present invention, if a valid transaction created by the entity is transmitted over a network multiple times by another malicious entity, points can be paid multiple times because all of the transmitted transactions are authorized when the affected entity has enough balance, and this is called a replay attack. The present invention may embed a unique nonce in a transaction to prevent the attack. In this case, the replay attack may be prevented because the attacker cannot create a valid signature value regarding the unique nonce. In detail, because a single transaction has a single unique nonce, if the unique nonce included in a received transaction is found to be used in another transaction received earlier, then the received transaction is determined as an anomalous transaction, i.e., an invalid transaction, thus the replay attack can be prevented.

In the third example embodiment, the step of S220 may include verification of the registration transaction TrxA by using the signature value of the registration transaction and the CPubA, or their processed values.

For example, a hash value may be acquired from the signature value of the registration transaction by using the CPubA, and validity of this signature value may be verified by comparing this hash value with a result of applying a hash function to the XEA.

Meanwhile, in the third example embodiment, the confirmation transaction TrxB may include (i) a unique nonce, (ii) the CPubA or its processed value, (iii) the PubPS or its processed value, and (iv) the second XEA, and (v) a signature value acquired by signing at least one of (i) to (iv) with the PrivPS. In this example embodiment, the step of S240 may include verification of the confirmation transaction by using the signature value and the PubPS, or their processed values.

The BDB is used in the third example embodiment, and at the aforementioned steps of S221 and S241, the BDB may be initialized to include the initial balance of the point distributor. This is for management of changes of the balances caused by transactions, using the BDB.

Next, the method of issuing the united point for providing the united point service in accordance with the third example embodiment of the present invention is disclosed, but the technological characteristics identical to that of the aforementioned first and second example embodiments will be omitted, and only specific details will be disclosed.

In the method of issuing the united point for providing the united point service in accordance with the third example embodiment of the present invention, the issuance transaction TrxA includes (i) a unique nonce, (ii) the CPubA or its processed value, (iii) the PubPS or its processed value, and (iv) the UPCA, and (v) a signature value acquired by signing at least one of (i) to (iv) with the PrivPS. The verification process of validity of the signature value is the same as the aforementioned.

In the third example embodiment, the BDB may be updated by applying a deltaA thereto which is a change of the BDB by the issuance transaction at the steps of S320 and S321.

Next, the method of distributing the united point for providing the united point service in accordance with the third example embodiment of the present invention is disclosed, but the technological characteristics identical to that of the aforementioned first and second example embodiments will be omitted, and only specific details will be disclosed.

In the third example embodiment, the distribution transaction TrxA may include (i) a unique nonce, (ii) the CPubA or its processed value, (iii) the PubUA or its processed value, and (iv) a united point UPUA of the user, and (v) a signature value acquired by signing at least one of (i) to (iv) with the CPrivA. The verification process of validity of the signature value is the same as the aforementioned.

In the third example embodiment, the BDB may be updated by applying a deltaA thereto which is a change of the BDB by the distribution transaction at the steps of S420 and S421.

Next, the method of using the united point for providing the united point service in accordance with the third example embodiment of the present invention is disclosed, but the technological characteristics identical to that of the aforementioned first and second example embodiments will be omitted, and only specific details will be disclosed.

In the third example embodiment regarding a usage transaction, the usage transaction TrxA may include (i) a unique nonce, (ii) the MPubA or its processed value, (iii) the PubUA or its processed value, and (iv) a usage amount which is the united point the user intends to use, and (v) a signature value acquired by signing at least one of (i) to (iv) with the PrivUA. The verification process of validity of the signature value is the same as the aforementioned.

In the third example embodiment, the BDB may be updated by applying a deltaA thereto which is a change of the BDB by the usage transaction at the steps of S520 and S521.

Next, the method of refunding the united point for providing the united point service in accordance with the third example embodiment of the present invention is disclosed, but the technological characteristics identical to that of the aforementioned first and second example embodiments will be omitted, and only specific details will be disclosed.

In the third example embodiment, the refund transaction TrxA may include (i) a unique nonce, (ii) the MPubA or the CPubA or their processed values, (iii) the PubPS or its processed value, and (iv) a refund amount which is the united point being refunded, and (v) a signature value acquired by signing at least one of (i) to (iv) with the MPrivA or the CPrivA. The verification process of validity of the signature value is the same as the aforementioned.

In the third example embodiment, the BDB may be updated by applying a deltaA thereto which is a change of the BDB by the refund transaction at the steps of S620 and S621.

An example embodiment of data recorded on the aforementioned BDB is disclosed in FIG. 10. The item "User Pubkey" may be a public key of an individual user which may be used for identification of the individual user, and the item "Balance" may be a remaining amount of the united point owned by the individual user.

An example embodiment of the changes of the BDB is disclosed in FIG. 11. The second row of the table in FIG. 11 may be a change data showing that the balance of an individual user identified by "c4 . . . dd"" is increased by 50,000 points.

Fourth Example Embodiment

Finally, the fourth example embodiment of the method of providing the united point service in accordance with the present invention is disclosed. Below, the technological characteristics identical to that of the aforementioned third example embodiment will be omitted, and only specific details will be disclosed. The fourth example embodiment includes every technical characteristic, e.g., a technical characteristic of using a Merkle tree, of the third example embodiment, and further includes the technical characteristic of calculating a representative hash value utilizing neighboring hash values as in the second example embodiment.

Specifically, by referring to FIG. 2 again, the method of registering the point distributor and the exchange rate for providing the united point service in accordance with the fourth example embodiment of the present invention further includes, after the steps of S220 and S240 in the third example embodiments, steps of S235 to S238 and S245 to S248, where, if at least one of the anchoring conditions is satisfied, the system managing server may (i) record or support another device to record a representative hash value or its processed value on the second blockchain database and (ii) acquire or support another device to acquire a confirmation transaction ID which is a locator of the representative hash value or its processed value on the second blockchain database, and where the representative hash value may be calculated by using (i) a specific hash value which is a hash value of at least one of the registration transaction TrxA, the confirmation transaction TrxB or their processed values and (ii) its corresponding one or more neighboring hash values.

In the fourth example embodiment, a specific neighboring hash value among the neighboring hash values may be a hash value of delta_n which are changes of the BDB caused by every transaction included in the n-th block, at the time that (i) to (vi) as disclosed in the second example embodiment are acquired and that (vii) the n-th block is being created in the blockchain. That is, in the fourth example embodiment, the specific neighboring hash value may be at least one of (i) a hash value of a specific registration transaction including a specific exchange rate XEX of a specific point X managed by a specific point distributor to the united point, (ii) a hash value of a specific confirmation transaction including the XEX, (iii) a hash value of a specific issuance transaction including (iii-1) a public key CPubX or its processed value of the specific point distributor and (iii-2) a UPCX which is a certain issued amount of the united point of the specific point distributor, (iv) a hash value of a distribution transaction including (iv-1) a public key PubUA or its processed value of a specific user and (iv-2) a united point UPUA of the specific user, (v) a hash value of a usage transaction including (v-1) a public key MPubA or its processed value of a specific seller who provides the specific user with goods or services and (v-2) a united point UPUA of the specific user, (vi) a hash value of a refund transaction including (vi-1) the PubPS or its processed value, and (vi-2) a united point UPMA of the specific point distributor or of the specific seller, and (vii) hash values of the delta_n.

Next, FIG. 9 is a diagram schematically illustrating a process of recording a point-related transaction on the second blockchain database in accordance with the present invention.

In accordance with the fourth example embodiment of the present invention, the system managing server may record a BDB header hash value in a block header of the n-th block when the n-th block is created in the first blockchain database, where the BDB header hash value is a hash value calculated from the delta_n.

In the fourth example embodiment, when (vii) the n-th block is being created in the blockchain, the hash values of the delta_n are recorded on the block header of the n-th block, thus those need not be allocated to leaf nodes. Therefore, (i) the hash value of the specific registration transaction, (ii) the hash value of the specific confirmation transaction, (iii) the hash value of the specific issuance transaction, (iv) the hash value of the distribution transaction, (v) the hash value of the usage transaction, and (vi) the hash value of the refund transaction, except the hash values of the delta_n.

Next, the method of issuing the united point for providing the united point service in accordance with the fourth example embodiment of the present invention is disclosed, but the technological characteristics identical to that of the aforementioned third example embodiment will be omitted, and only specific details will be disclosed.

Specifically, by referring to FIG. 3 again, the method of issuing the united point for providing the united point service in accordance with the fourth example embodiment of the present invention further includes steps of S325 to S328, where, after the steps of S320 and S321 in the third example embodiment, if at least one of the anchoring conditions is satisfied, the system managing server 100 may (i) record or support another device to record a second representative hash value or its processed value calculated by using (i-1) a second specific hash value which is a hash value of the valid issuance transaction TrxA or its processed value and (i-2) its corresponding one or more neighboring hash values, on the second blockchain database and (ii) acquire or support another device to acquire an issuance transaction ID which is a locator of the second representative hash value or its processed value on the second blockchain database. This is similar to the aforementioned. On the other hand, processes of creating the representative hash value from the specific hash value and recording it on the second blockchain database are similar to the processes aforementioned, and thus omitted.

Next, the method of distributing the united point for providing the united point service in accordance with the fourth example embodiment of the present invention is disclosed, but the technological characteristics identical to that of the aforementioned third example embodiment will be omitted, and only specific details will be disclosed.

Specifically, by referring to FIG. 4 again, the method of distributing the united point for providing the united point service in accordance with the fourth example embodiment of the present invention may further include steps of S425 to S428, where, after the steps of S420 and S421 in the third example embodiment, if at least one of the anchoring conditions is satisfied, the system managing server 100 may (i) record or support another device to record a second representative hash value or its processed value calculated by using (i-1) a second specific hash value which is a hash value of the valid distribution transaction TrxA or its processed value and (i-2) its corresponding one or more neighboring hash values, on the second blockchain database and (ii) acquire or support another device to acquire a distribution transaction ID which is a locator of the second representative hash value or its processed value on the second blockchain database. This is similar to the aforementioned. On the other hand, processes of creating the representative hash value from the specific hash value and recording it on the second blockchain database are similar to the processes aforementioned, and thus omitted.

Next, the method of using the united point for providing the united point service in accordance with the fourth example embodiment of the present invention is disclosed, but the technological characteristics identical to that of the aforementioned third example embodiment will be omitted, and only specific details will be disclosed.

Specifically, by referring to FIG. 5 again, the method of using the united point for providing the united point service in accordance with the fourth example embodiment of the present invention further includes steps of S525 to S528, where, after the steps of S520 and S521 in the third example embodiment, if at least one of the anchoring conditions is satisfied, the system managing server 100 may (i) record or support another device to record a second representative hash value or its processed value calculated by using (i-1) a second specific hash value which is a hash value of the valid usage transaction TrxA or its processed value and (i-2) its corresponding one or more neighboring hash values, on the second blockchain database and (ii) acquire or support another device to acquire a usage transaction ID which is a locator of the second representative hash value or its processed value on the second blockchain database. This is similar to the aforementioned. On the other hand, processes of creating the representative hash value from the specific hash value and recording it on the second blockchain database are similar to the processes aforementioned, and thus omitted.

Finally, the method of refunding the united point for providing the united point service in accordance with the fourth example embodiment of the present invention is disclosed, but the technological characteristics identical to that of the aforementioned third example embodiment will be omitted, and only specific details will be disclosed.

Specifically, by referring to FIG. 6 again, the method of refunding the united point for providing the united point service in accordance with the fourth example embodiment of the present invention further includes steps of S625 to S628, where, after the steps of S620 and S621 in the third example embodiment, if at least one of the anchoring conditions is satisfied, the system managing server 100 may (i) record or support another device to record a second representative hash value or its processed value calculated by using (i-1) a second specific hash value which is a hash value of the valid refund transaction TrxA or its processed value and (i-2) its corresponding one or more neighboring hash values, on the second blockchain database and (ii) acquire or support another device to acquire a refund transaction ID which is a locator of the second representative hash value or its processed value on the second blockchain database. This is similar to the aforementioned. On the other hand, processes of creating the representative hash value from the specific hash value and recording it on the second blockchain database are similar to the processes aforementioned, and thus omitted.

The present invention has an effect of distributing and managing the united point and the individual points using a lower-cost technique with stronger security and more effective usability, and of improving reliability and security of a point distributing system by completely blocking illegal copying or forgery, in all of the aforementioned embodiments of the present invention.

The advantages of the technology disclosed herein with the above embodiments are guarantees of reliability of the point distributing system by essentially blocking forgery of point-related information, i.e., public keys, hash values. The technology further makes it possible to improve service speed and reduce the transaction cost by configuring a Merkle tree by using related information, which is information on point transaction, i.e., issuing, distributing, using, and refunding of points, etc., and then by registering only a root value of the Merkle tree with the blockchain, instead of registering all of the information.

The present invention has another effect of improving the reliability and the security of the point distributing system by recording the point-related transactions on the blockchain of the virtual currency to prevent forgery or illegal copying.

For this purpose, the present invention forces every entity participating in issuing, distributing and using of points to use cryptographical technologies like public key-private key pair algorithm, e.g., RSA, ECC, and hash functions, etc., to guarantee security and prevent forgery.

The present invention has still another effect of improving the reliability and the security of the point distributing system by facilitating integrated and individual management of the points via recording transactions about exchanging of the individual points and the united point on the blockchain of the virtual currency, and by preventing problems like duplicate issuance.

Based on the explanation of the above embodiments, those skilled in the art can clearly understand that the present invention may be implemented by combination of software and hardware or hardware alone. The part contributing to the prior art or the object of a technical solution of the present invention may be implemented in a form of executable program command through a variety of computer components and recorded to computer readable media. The computer readable media may include solely or in combination, program commands, data files, and data structures. The program commands recorded to the media may be components specially designed for the present invention or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for issuing a united point to provide a united point service, the method comprising:
   recording, by a system managing server, a confirmation transaction on a first blockchain database, wherein the confirmation transaction includes an unique exchange rate XEA of a unit of a point A managed by a point distributor to that of the united point;
   acquiring, by the system managing server, a first confirmation transaction ID which is a locator of the confirmation transaction on the first blockchain database;
   determining whether an anchoring condition is satisfied, the anchoring condition being that a certain number of a specific hash value and neighboring hash values are acquired or generated;
   in response to determining that the anchoring condition is satisfied:
      recording, by the system managing server, a first representative hash value on a second blockchain database, wherein the first representative hash value is calculated by using (i) a first specific hash value which is a hash value of the confirmation transaction and (ii) one or more neighboring hash values of the first specific hash value; and
      acquiring, by the system managing server, a second confirmation transaction ID which is a locator of the first representative hash value on the second blockchain database:
   acquiring, by the system managing server, an issuance transaction from a point managing server which manages the united point service, wherein the issuance transaction includes (i) a public key CPubA of the point distributor and (ii) a UPCA which is an issued amount of the united point of the point distributor;
   determining, by the system managing server whether the issuance transaction is valid;
   in response to determining that the issuance transaction is valid;
      recording, by the system managing server, the issuance transaction on the first blockchain database; and
      acquiring, by the system managing server, a first issuance transaction ID which is a locator of the issuance transaction on the first blockchain database, to thereby allow the point distributor to exchange the UPCA to the point A by using the exchange rate XEA recorded on the first blockchain database;
   in response to determining that the anchoring condition is satisfied:
      recording, by the system managing server, a second representative hash value on the second blockchain database, wherein the second representative hash value is calculated by using (i) a second specific hash value which is a hash value of the issuance transaction and (ii) one or more neighboring hash values of the second specific hash value; and
      acquiring, by the system managing server, a second issuance transaction ID which is a locator of the second representative hash value on the second blockchain database;
   verifying an integrity of the first blockchain database by comparing the first representative hash value and the first issuance transaction ID with the second representative hash value and second issuance transaction ID wherein the verifying confirms the integrity of the first blockchain database in a case that the first representative hash value and the first issuance transaction ID correspond with the second representative hash value and second issuance transaction ID.

2. The method of claim 1, wherein the recording by the system managing server of the issuance transaction on the first blockchain database includes recording the issuance transaction on the second blockchain database.

3. The method of claim 2, further comprising transmitting in a case that the issuance transaction is recorded, a response including the first issuance transaction ID, which is a locator of the issuance transaction on the first blockchain database, to at least one of the point distributing server and the point managing server.

4. The method of claim 1, further comprising signing at least one of (i) the CPubA, (ii) the UPCA, (iii) a public key PubPS of the point managing server, to acquire (iv) a signature value with a private key PrivPS of the point managing server, the issuance transaction including (i) to (iv).

5. The method of claim 4, further comprising verifying, by the system managing server, the issuance transaction by using the signature value and the PubPS.

6. The method of claim 1, if further comprising transmitting, in a case that the issuance transaction is determined as invalid, a response indicating that the issuance transaction is invalid to at least one of the point distributing server and the point managing server.

7. A system managing server for issuing a united point to provide a united point service, the system managing server comprising:
  processing circuitry configured to:
    record a confirmation transaction on a first blockchain database, wherein the confirmation transaction includes an unique exchange rate XEA of a unit of a point A managed by a point distributor to that of the united point;
    acquire a first confirmation transaction ID which is a locator of the confirmation transaction on the first blockchain database;
    determine whether an anchoring condition is satisfied, the anchoring condition being that a certain number of a specific hash value and neighboring hash values are acquired or generated;
    in response to determining that the anchoring condition is satisfied:
      record a first representative hash value on a second blockchain database, wherein the first representative hash value is calculated by using (i) a first specific hash value which is a hash value of the confirmation transaction and iii) one or more neighboring hash values of the first specific hash value; and
      acquire a second confirmation transaction IIS which is a locator of the first representative hash value on the second blockchain database:
    acquire an issuance transaction from a point managing server which manages the united point service, wherein the issuance transaction includes (i) a public key CPubA of the point distributor and (ii) a UPCA which is an issued amount of the united point of the point distributor;
    determine whether the issuance transaction is valid;
    in response to determining that the issuance transaction is valid:
      record the issuance transaction on a certain blockchain database; and
      acquire a first issuance transaction ID which is a locator of the issuance transaction on the certain blockchain database, to thereby allow the point distributor to exchange the UPCA to the point A by using the exchange rate XEA recorded on the first blockchain database;
    in response to determine that the anchoring condition is satisfied:
      record a second representative hash value on the second blockchain database wherein the second representative hash value is calculated by using 0) a second specific hash value which is a hash value of the issuance transaction and (ii) one or more neighboring hash values of the second specific hash value; and
      acquire a second issuance transaction ID which is a locator of the second representative hash value on the second blockchain database; and
    verify an integrity of the first blockchain database by comparing the first representative hash value and the first issuance transaction ID with the second representative hash value and second issuance transaction ID, wherein the verifying confirms the integrity of the first blockchain database in a case that the first representative hash value and the first issuance transaction ID correspond with the second representative hash value and second issuance transaction ID.

* * * * *